US012664715B2

(12) United States Patent (10) Patent No.: US 12,664,715 B2
Garvey et al. (45) Date of Patent: Jun. 23, 2026

(54) SAMPLER FEEDBACK FOR TEXTURE SPACE SHADING

(71) Applicant: QUALCOMM Incorporated, San Diego, CA (US)

(72) Inventors: Joseph Daniel Garvey, San Diego, CA (US); Bojan Vrcelj, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 34 days.

(21) Appl. No.: 18/467,666

(22) Filed: Sep. 14, 2023

(65) Prior Publication Data

US 2025/0095266 A1 Mar. 20, 2025

(51) Int. Cl.
G06T 15/00 (2011.01)
G06T 15/04 (2011.01)
G06T 15/80 (2011.01)

(52) U.S. Cl.
CPC ............ G06T 15/005 (2013.01); G06T 15/04 (2013.01); G06T 15/80 (2013.01)

(58) Field of Classification Search
CPC ....... G06T 15/005; G06T 15/04; G06T 15/80; G06T 1/60
See application file for complete search history.

(56) References Cited

U.S. PATENT DOCUMENTS

| | | | | |
|---|---|---|---|---|
| 6,714,195 B1* | 3/2004 | Ezra | ........................ | G06T 15/04 |
| | | | | 345/581 |
| 7,164,426 B1* | 1/2007 | Duluk, Jr. | ............... | G06T 15/40 |
| | | | | 345/566 |
| 7,382,377 B1* | 6/2008 | Everitt | .................... | G06T 15/04 |
| | | | | 345/428 |
| 8,773,448 B2* | 7/2014 | LaLonde | .................. | G06T 1/20 |
| | | | | 345/506 |
| 10,198,860 B1 | 2/2019 | Smith et al. | | |
| 12,475,638 B2 | 11/2025 | Fanello et al. | | |

(Continued)

OTHER PUBLICATIONS

Molnar, Steven, et al. "A sorting classification of parallel rendering." IEEE computer graphics and applications 14.4 (1994): 23-32.*

(Continued)

*Primary Examiner* — Sarah Lhymn
(74) *Attorney, Agent, or Firm* — Procopio, Cory, Hargreaves & Savitch LLP

(57) ABSTRACT

This disclosure provides systems, devices, apparatus, and methods, including computer programs encoded on storage media, for sampler feedback for texture space shading. A processor may assign each shading element in a set of shading elements associated with a geometry unit to a corresponding shading element group in a set of shading element groups. The processor may identify whether each shading element is a visible shading element. The processor may calculate a group offset value for each shading element group in the set of shading element groups based on a number of visible shading elements in the set of shading elements. The processor may calculate an element offset value for each shading element based on a number of visible shading elements. The processor may allocate, based on the element offset value and the group offset value, texture memory to the visible shading elements.

30 Claims, 24 Drawing Sheets

(56) References Cited

U.S. PATENT DOCUMENTS

| | | | | |
|---|---|---|---|---|
| 2004/0130552 | A1* | 7/2004 | Duluk, Jr. ............. | G06T 15/005 |
| | | | | 345/506 |
| 2007/0171234 | A1 | 7/2007 | Crawfis et al. | |
| 2007/0220525 | A1* | 9/2007 | State .................... | G06F 9/5038 |
| | | | | 718/107 |
| 2014/0267346 | A1 | 9/2014 | Ren et al. | |
| 2014/0333621 | A1 | 11/2014 | Hillesland et al. | |
| 2015/0379763 | A1* | 12/2015 | Liktor .................. | G06T 15/005 |
| | | | | 345/426 |
| 2016/0048999 | A1* | 2/2016 | Patney ................. | G06T 17/205 |
| | | | | 345/426 |
| 2016/0049000 | A1 | 2/2016 | Patney et al. | |
| 2016/0275920 | A1* | 9/2016 | Apodaca ................ | G06T 15/40 |
| 2017/0221177 | A1* | 8/2017 | Worcester .............. | G06T 11/40 |
| 2018/0144535 | A1* | 5/2018 | Ford ..................... | G06T 15/005 |
| 2018/0165786 | A1* | 6/2018 | Bourd ........................ | G06T 1/20 |
| 2019/0012829 | A1* | 1/2019 | Engh-Halstvedt ........ | G06T 1/20 |
| 2019/0066370 | A1* | 2/2019 | Schmalstieg .......... | G06T 15/04 |
| 2020/0027260 | A1 | 1/2020 | Harris et al. | |
| 2020/0311042 | A1* | 10/2020 | Doyle ..................... | G06T 15/00 |
| 2020/0364088 | A1* | 11/2020 | Ashwathnarayan ...... | G06F 9/50 |
| 2020/0410631 | A1* | 12/2020 | Doyle ........................ | G06T 1/20 |
| 2021/0118214 | A1* | 4/2021 | Baker .................... | G06T 17/20 |
| 2021/0209717 | A1* | 7/2021 | Du ........................... | G06T 1/20 |
| 2021/0304483 | A1* | 9/2021 | Garvey .................. | G06T 7/529 |
| 2022/0319094 | A1* | 10/2022 | Nourai ..................... | G06T 1/60 |
| 2022/0327762 | A1* | 10/2022 | Panteleev ............. | G06T 15/506 |
| 2024/0320782 | A1* | 9/2024 | Tessari .................. | G06T 15/005 |
| 2025/0095266 | A1* | 3/2025 | Garvey .................... | G06T 1/60 |

OTHER PUBLICATIONS

Baker D., et al., "Generalized Decoupled and Object Space Shading System", Eurographics Symposium on Rendering, 2022, pp. 134-143.

Burley B., et al., "Ptex: Per-Face Texture Mapping for Production Rendering", Eurographics Symposium on Rendering, vol. 27, No. 4, 2008, 10 Pages.

Clarberg P., et al., "AMFS: Adaptive Multi-Frequency Shading for Future Graphics Processors", ACM Transactions on Graphics, Proceedings of SIGGRAPH 2014, vol. 33, No. 4, Aug. 2014, 12 Pages.

Fascione L., et al., "Manuka: A batch-Shading Architecture for Spectral Path Tracing in Movie Production", ACM Transactions on Graphics, vol. 37, No. 3, Published on Aug. 2018, pp. 1-18.

Gierach J., et al., "Applying DirectX Sampler Feedback: Texture Space Shading and Streaming with DirectStorage", Intel Corporation, 2021, 62 Pages.

Hillesland K.E., et al., "Texel Shading", Advanced Micro Devices, Inc., Eurographics, 2016, pp. 74-76.

Hladky J., et al., "SnakeBinning: Efficient Temporally Coherent Triangle Packing for Shading Streaming", Computer Graphics Forum, Eurographics 2021, vol. 40, No. 2, May 2021, pp. 476-488.

Hladky J., et al., "QuadStream: A Quad-Based Scene Streaming Architecture for Novel Viewpoint Reconstruction", Association for Computing Machinery Transactions on Graphics, vol. 41, No. 6, Published on Dec. 2022, pp. 1-13.

Hladky J., et al., "Tessellated Shading Streaming", Eurographics Symposium on Rendering 2019, In Computer Graphics Forum, vol. 38, No. 4, 2019, 12 Pages.

Levy B., et al., "Least Squares Conformal Maps for Automatic Texture Atlas Generation", ACM Transactions on Graphics, vol. 21, No. 3, Jul. 1, 2002, pp. 362-371.

Mueller J.H., et al., "Shading Atlas Streaming", ACM Transactions on Graphics, ACM, NY, US, vol. 37, No. 6, Dec. 4, 2018, Published on Nov. 2018, pp. 1-16, XP058686879, ISSN: 0730-0301, Section 3 System Overview, Section 4 Shading Atlas.

Schied C., et al., "Deferred Attribute Interpolation for Memory-Efficient Deferred Shading", HPG '15: Proceedings of the 7th Conference on High-Performance Graphics, Aug. 7, 2015, pp. 43-49.

Stengel M., et al., "A Distributed, Decoupled System for Losslessly Streaming Dynamic Light Probes to Thin Clients", arXiv:2103. 05875v1 [cs.DC], Mar. 10, 2021, pp. 1-13.

Weinstein D., "Nvidia Cloudxr™", Nvidia, Dec. 19, 2019, 30 Pages.

Burns C.A., et al., "A Lazy Object-Space Shading Architecture With Decoupled Sampling", High Performance Graphics, Eurographics Association, P. O. Box 16Aire-la-Villech-1288 Switzerland, Jun. 25, 2010, pp. 19-28, XP058376226, p. 22, left-hand colum—p. 23, left-hand column, Appendix A.

Cook R.L., et al., "The Reyes Image Rendering Architecture", Computer Graphics, ACM, US, vol. 21, No. 4, Aug. 1987, pp. 95-102, Jul. 1987, XP058231748, section 2.3 Micropolygons.

Fisher M., et al., "DiagSplit: Parallel, Crack-Free, Adaptive Tessellation for Micropolygon Rendering", SIGGRAPH Asia '09: ACM SIGGRAPH Asia 2009 papers, ACM Press, New York, USA, ACM Transactions on Graphics, vol. 28, No. 5, Article 150, Dec. 2009, pp. 1-10, XP058103941, Abstract section 2.1 Split-Dice.

Gill S., et al., "Polygonal Meshing for 3D Stereo Video Sensor Data", 2008 Canadian Conference on Computer and Robot Vision (CRV '08), IEEE, Piscataway, NJ, USA, May 28, 2008, pp. 278-285, XP031284926, p. 279, right-hand column, line 5—line 10.

International Search Report and Written Opinion—PCT/US2024/044684—ISA/EPO—Nov. 21, 2024.

Neff T., et al., "Meshlets and How to Shade Them: A Study on Texture-Space Shading", Eurographics, vol. 41, No. 2, May 24, 2022, pp. 277-287, XP093013576, section 3 Meshlet shading atlas, figure 3.

Salmijarvi S., "Efficient Texture Space Shading Using Sampling Location Feedback", Aalto University, Dec. 20, 2020, 64 Pages, XP002809087, p. 39-p. 41.

* cited by examiner

200

TSS 502

Geometry 504
World Space 506

Visibility Sampling 508
Screen Space 510

Texture Space Sampling 512
Screen Space 510

Appearance Sampling 514
Texture Space 516

Appearance Re-Sampling 518
Screen Space 510

500

One-Triangle Patch 702

Two-Triangle Patch 704

Three-Triangle Patch 706

Shading Atlas 708

Shade

Triangle Patch 1
710 – (Visible)

Triangle Patch 2
712 – (Visible)

Triangle Patch 3
714 – (Not Visible)

700

Block 808

Texture Space 806

Two-Triangle Patch 802

Screen Space 804

800

Reyes Rendering Pipeline 1002

Rasterization 1018

Z-Max Culling 1016

Backface Culling 1014

Surface Evaluation 1012

Surface Shader 1020

Color Lookup 1022

Polygon Grid 1008

Shading Grid 1010

Tessellation 1006 – (Split/Dice)

Curved Surface 1004

1000

Example 1202 – Mesh Segmentation and UV Unwrapping

UV Unwrapping 1210

Mesh Segmentation 1208

Meshlets 1206

Meshlets 1206

Mesh 1204

1200

Example 1302 – Deferred Attribute Interpolation

Shading Position 1306

Sample Point 1308

Attributes 1310

Triangle 1304

$F(x' + \Delta x, y' + \Delta y)$ $\Delta y$ $\Delta x$ $F(x', y')$

1300

$$F(x' + \Delta x, y' + \Delta y) = F(x', y') + \Delta x(\delta F/\delta x) + \Delta y(\delta F/\delta y)$$

1500

AMFS 1502

Pixel Area 1504

Example 1602 – View Dependent Shadels

View 1 1606

Shadels 1 1604

View 2 1610

Shadels 2 1608

Example 1802 – Memory Allocation

Shading Atlas 708

Shading Atlas Address 1804

Texture 1806

Shading Rate 1 2010

Shading Rate 2 2012

VRS 2002

Frame 2004

Region 2 2008

Region 1 2006

2000

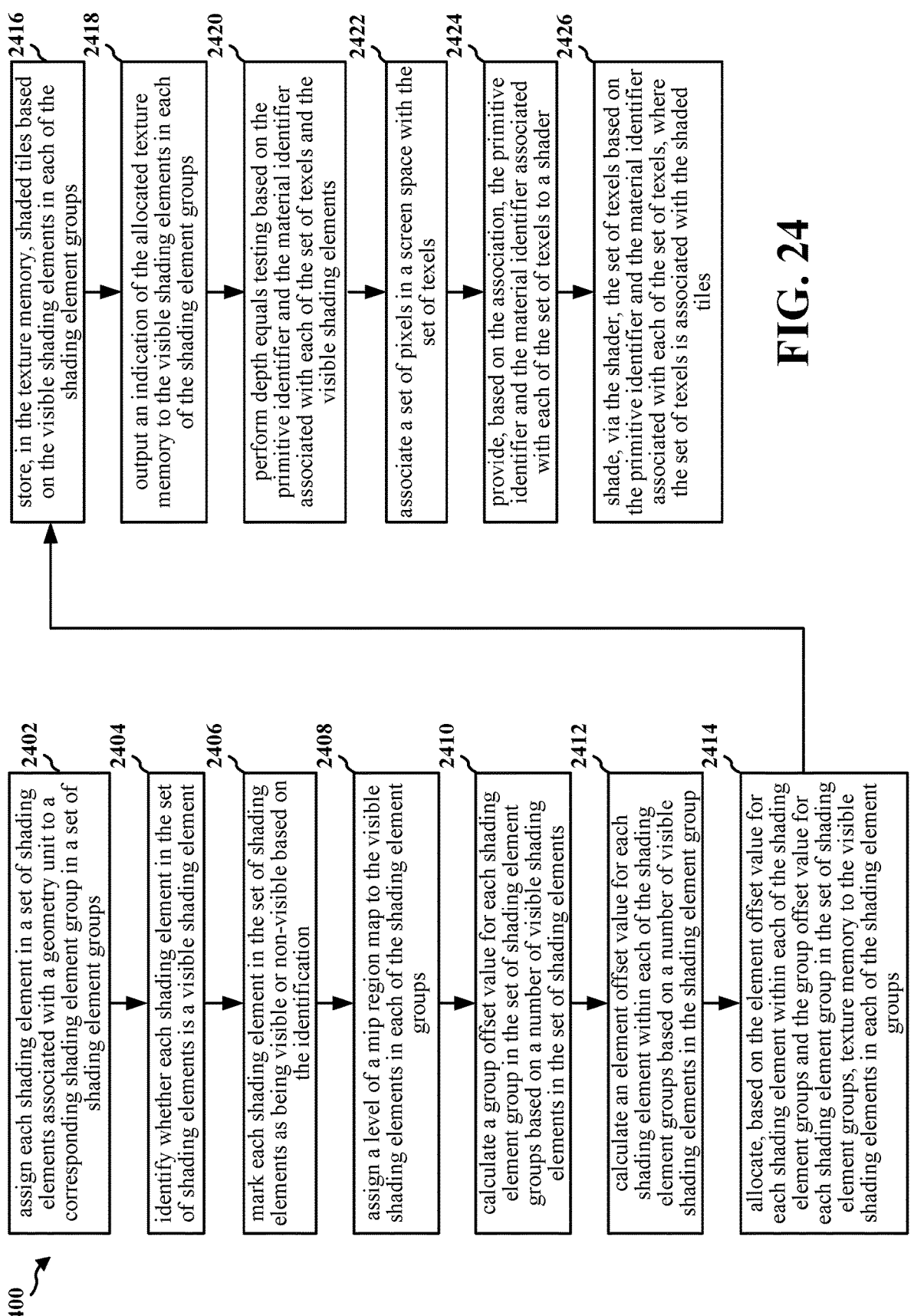

2402 — assign each shading element in a set of shading elements associated with a geometry unit to a corresponding shading element group in a set of shading element groups 2404 — identify whether each shading element in the set of shading elements is a visible shading element 2406 — mark each shading element in the set of shading elements as being visible or non-visible based on the identification 2408 — assign a level of a mip region map to the visible shading elements in each of the shading element groups 2410 — calculate a group offset value for each shading element group in the set of shading element groups based on a number of visible shading elements in the set of shading elements 2412 — calculate an element offset value for each shading element within each of the shading element groups based on a number of visible shading elements in the shading element group 2414 — allocate, based on the element offset value for each shading element within each of the shading element groups and the group offset value for each shading element group in the set of shading element groups, texture memory to the visible shading elements in each of the shading element groups 2416 — store, in the texture memory, shaded tiles based on the visible shading elements in each of the shading element groups 2418 — output an indication of the allocated texture memory to the visible shading elements in each of the shading element groups 2420 — perform depth equals testing based on the primitive identifier and the material identifier associated with each of the set of texels and the visible shading elements 2422 — associate a set of pixels in a screen space with the set of texels 2424 — provide, based on the association, the primitive identifier and the material identifier associated with each of the set of texels to a shader 2426 — shade, via the shader, the set of texels based on the primitive identifier and the material identifier associated with each of the set of texels, where the set of texels is associated with the shaded tiles

SAMPLER FEEDBACK FOR TEXTURE SPACE SHADING

TECHNICAL FIELD

The present disclosure relates generally to processing systems, and more particularly, to one or more techniques for graphics processing.

INTRODUCTION

Computing devices often perform graphics and/or display processing (e.g., utilizing a graphics processing unit (GPU), a central processing unit (CPU), a display processor, etc.) to render and display visual content. Such computing devices may include, for example, computer workstations, mobile phones such as smartphones, embedded systems, personal computers, tablet computers, and video game consoles. GPUs are configured to execute a graphics processing pipeline that includes one or more processing stages, which operate together to execute graphics processing commands and output a frame. A central processing unit (CPU) may control the operation of the GPU by issuing one or more graphics processing commands to the GPU. Modern day CPUs are typically capable of executing multiple applications concurrently, each of which may need to utilize the GPU during execution. A display processor may be configured to convert digital information received from a CPU to analog values and may issue commands to a display panel for displaying the visual content. A device that provides content for visual presentation on a display may utilize a CPU, a GPU, and/or a display processor.

Current techniques for textures space shading (TSS) may be based on an assumption that a texture resolution is relatively similar to a screen resolution. Furthermore, current techniques for TSS may utilize a precomputed triangle identifier (ID) texture which may be associated with a relatively large amount of texture memory. There is a need for improved TSS techniques.

BRIEF SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus for graphics processing are provided. The apparatus includes a memory; and a processor coupled to the memory and, based on information stored in the memory, the processor is configured to: assign each shading element in a set of shading elements associated with a geometry unit to a corresponding shading element group in a set of shading element groups; identify whether each shading element in the set of shading elements is a visible shading element; calculate a group offset value for each shading element group in the set of shading element groups based on a number of visible shading elements in the set of shading elements; calculate an element offset value for each shading element within each of the shading element groups based on a number of visible shading elements in the shading element group; and allocate, based on the element offset value for each shading element within each of the shading element groups and the group offset value for each shading element group in the set of shading element groups, texture memory to the visible shading elements in each of the shading element groups.

To the accomplishment of the foregoing and related ends, the one or more aspects include the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 16 is a diagram illustrating an example of view dependent shadels in accordance with one or more techniques of this disclosure.

FIG. 17 is a diagram illustrating example aspects of shadel allocation in accordance with one or more techniques of this disclosure.

FIG. 24 is a flowchart of an example method of graphics processing in accordance with one or more techniques of this disclosure.

DETAILED DESCRIPTION

Figure 1:
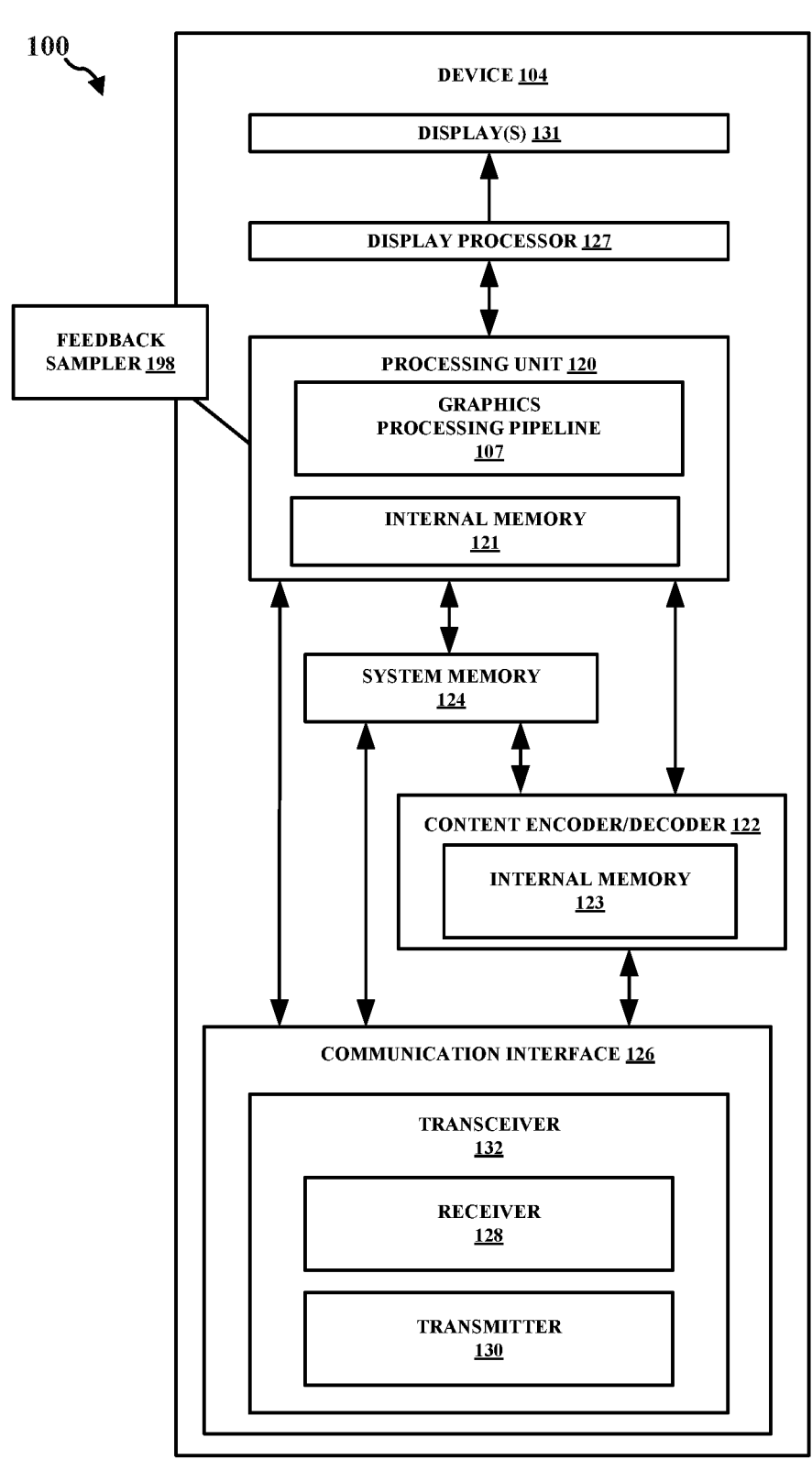
FIG. 1 is a block diagram that illustrates an example content generation system in accordance with one or more techniques of this disclosure.

Various aspects of systems, apparatuses, computer program products, and methods are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of this disclosure to those skilled in the art. Based on the teachings herein one skilled in the art should appreciate that the scope of this disclosure is intended to cover any aspect of the systems, apparatuses, computer program products, and methods disclosed herein, whether implemented independently of, or combined with, other aspects of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. Any aspect disclosed herein may be embodied by one or more elements of a claim.

Although various aspects are described herein, many variations and permutations of these aspects fall within the scope of this disclosure. Although some potential benefits and advantages of aspects of this disclosure are mentioned, the scope of this disclosure is not intended to be limited to particular benefits, uses, or objectives. Rather, aspects of this disclosure are intended to be broadly applicable to different wireless technologies, system configurations, processing systems, networks, and transmission protocols, some of which are illustrated by way of example in the figures and in the following description. The detailed description and drawings are merely illustrative of this disclosure rather than limiting, the scope of this disclosure being defined by the appended claims and equivalents thereof.

Several aspects are presented with reference to various apparatus and methods. These apparatus and methods are described in the following detailed description and illustrated in the accompanying drawings by various blocks, components, circuits, processes, algorithms, and the like (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors (which may also be referred to as processing units). Examples of processors include microprocessors, microcontrollers, graphics processing units (GPUs), general purpose GPUs (GPGPUs), central processing units (CPUs), application processors, digital signal processors (DSPs), reduced instruction set computing (RISC) processors, systems-on-chip (SOCs), baseband processors, application specific integrated circuits (ASICs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software can be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

The term application may refer to software. As described herein, one or more techniques may refer to an application (e.g., software) being configured to perform one or more functions. In such examples, the application may be stored in a memory (e.g., on-chip memory of a processor, system memory, or any other memory). Hardware described herein, such as a processor may be configured to execute the application. For example, the application may be described as including code that, when executed by the hardware, causes the hardware to perform one or more techniques described herein. As an example, the hardware may access the code from a memory and execute the code accessed from the memory to perform one or more techniques described herein. In some examples, components are identified in this disclosure. In such examples, the components may be hardware, software, or a combination thereof. The components may be separate components or sub-components of a single component.

In one or more examples described herein, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can include a random access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

As used herein, instances of the term "content" may refer to "graphical content," an "image," etc., regardless of whether the terms are used as an adjective, noun, or other parts of speech. In some examples, the term "graphical content," as used herein, may refer to a content produced by one or more processes of a graphics processing pipeline. In further examples, the term "graphical content," as used herein, may refer to a content produced by a processing unit configured to perform graphics processing. In still further examples, as used herein, the term "graphical content" may refer to a content produced by a graphics processing unit.

Texture space shading (TSS) may refer to a graphics processing technique whereby appearance sampling takes place in a texture space (as opposed to a screen space). Stated differently, TSS may enable geometry to be rasterized in a texture space (as opposed to a screen space). TSS may enable visibility sampling (i.e., rasterization and z-testing) and appearance sampling (i.e., shading) to be decoupled. For instance, TSS may enable visibility sampling and appearance sampling to be performed at a different rate, on a different sampling grid, and/or in a different time frame. TSS may be associated with various advantages at a graphics processor, such as improving efficiency of extended reality (XR) rendering at a graphics processor. TSS may operate on an assumption that a texture resolution is relatively similar to a screen resolution. However, this assumption may not always hold, such as in cases of texture tiling and/or procedural texture generation. Furthermore, TSS may utilize a precomputed triangle ID texture which may result in a relatively large increase in texture memory. Additionally, the precomputed triangle ID texture may have compatibility issues with procedural geometry and/or virtualized geometry. Stated differently, TSS may rely on precomputed triangle index textures for shading, which may increase texture memory usage and which may be incompatible with out-of-core geometry and/or procedural geometry.

Various technologies pertaining to a dicing oracle (e.g., a Reyes style dicing oracle) for texture space shading are described herein. In one example, an apparatus (e.g., a graphics processor) obtains an indication of a UV parameterization for each of a set of geometry units (e.g., triangles) and a target number of pixels per region of the UV parameterization, where the UV parameterization includes a first set of UV coordinates for an object space. The "U" and the "V" in "UV parameterization" may refer to a horizontal axis and a vertical axis, respectively, in two-dimensional (2D) space. Object space may refer to a coordinate system in which each object in a scene (i.e., each scene object) is described. Each scene object may have its own coordinate system in which its geometry is defined and a texture which may be related to an unwrapping of the geometry in 2D space. The scene may be described in world space. An object-to-world transform may relate all individual object coordinates to (common) world space coordinates. Screen space may be related to a camera/view space, which may also be related to a clip space. A view transform/matrix transform may transform all geometry from a world space into a coordinate system aligned with a camera (position, orientation)-camera space. Camera space coordinates may be selected to correspond to a sensor plane of the camera and an optical axis of the camera. Intrinsic properties of the camera (e.g., field of view (FoV), focal length, optical center, etc.) may determine a transformation from camera space into clip space. Screen space may be a 2D rasterization of all geometry elements from clip space onto a 2D plane (perpendicular to a z-axis common to a screen space, camera/view space, and clip space. Screen space may be independent of a camera resolution and may be defined in canonical u, w coordinates spanning (−1, 1). Screen space may also refer to a pixel-scaled screen space (scaled by a sensor resolution) such that x, y coordinates in the screen space range from zero to a maximum resolution. The apparatus renders the set of geometry units in order to obtain a second set of UV coordinates for a screen space and a set of derivatives for the second set of UV coordinates. The apparatus calculates a resolution for a mip region map based on the set of derivatives for the second set of UV coordinates and the target number of pixels per region of the UV parameterization. The apparatus outputs an indication of the calculated resolution for the mip region map. In another example, an apparatus (e.g., a graphics processor) assigns each shading element in a set of shading elements associated with a geometry unit to a corresponding shading element group in a set of shading element groups. The apparatus identifies whether each shading element in the set of shading elements is a visible shading element. The apparatus calculates a group offset value for each shading element group in the set of shading element groups based on a number of visible shading elements in the set of shading elements. The apparatus calculates an element offset value for each shading element within each of the shading element groups based on a number of visible shading elements in the shading element group. The apparatus allocates, based on the element offset value for each shading element within each of the shading element groups and the group offset value for each shading element group in the set of shading element groups, texture memory to the visible shading elements in each of the shading element groups Vis-à-vis calculating a resolution for a mip region map (i.e., a view dependent mip region map) based on the set of derivatives for the second set of UV coordinates and the target number of pixels per region of the UV parameterization, the apparatus may enable TSS to be performed in scenarios where texture resolution is not relatively similar to a screen resolution, such as in cases of texture tiling and/or procedural texture generation. Furthermore, vis-à-vis allocating the texture memory (i.e., memory used to store a texture) to the visible shading elements in each of the shading element groups based on the element offset value for each shading element within each of the shading element groups and the group offset value for each shading element group in the set of shading element groups, the apparatus may reduce an amount of texture memory used for TSS.

Texture space shading (TSS) may be unscalable for AAA game engines. In one aspect, a real-time dicing oracle that outputs a view-dependent multum in parvo (mip) region map for each visible meshlet in a scene is described herein. The real-time dicing oracle may eliminate a characteristic of TSS that assets have a high-resolution (matching a target screen resolution) and unique (no triangle overlap in UV space) texture mapping in order to be shaded in a TSS pipeline. After dicing, the shadels may not have a physical address space. In another aspect, a method of mapping virtual UV coordinates to resident (physical) texture coordinates is described herein. Shadels may be grouped into shadel collections, visible shadels may be marked, offsets may be determined, and memory may be allocated using a memory management strategy (e.g., Shading Atlas Streaming). This may enable sampler feedback which may be used for Texture Space Shading.

The examples describe herein may refer to a use and functionality of a graphics processing unit (GPU). As used herein, a GPU can be any type of graphics processor, and a graphics processor can be any type of processor that is designed or configured to process graphics content. For example, a graphics processor or GPU can be a specialized electronic circuit that is designed for processing graphics content. As an additional example, a graphics processor or GPU can be a general purpose processor that is configured to process graphics content.

A user may wear a display device in order to experienced extended reality (XR) content. XR may refer to a technology that blends aspects of a digital experience and the real world. XR may include augmented reality (AR), mixed reality (MR), and/or virtual reality (VR). In AR, AR objects may be superimposed on a real-world environment as perceived through the display device. In an example, AR content may be experienced through AR glasses that include a transparent or semi-transparent surface. An AR object may be projected onto the transparent or semi-transparent surface of the glasses as a user views an environment through the glasses. In general, the AR object may not be present in the real world and the user may not interact with the AR object. In MR, MR objects may be superimposed on a real-world environment as perceived through the display device and the user may interact with the MR objects. In some aspects, MR objects may include "video see through" with virtual content added. In an example, the user may "touch" a MR object being displayed to the user (i.e., the user may place a hand at a location in the real world where the MR object appears to be located from the perspective of the user), and the MR object may "move" based on the MR object being touched (i.e., a location of the MR object on a display may change). In general, MR content may be experienced through MR glasses (similar to AR glasses) worn by the user or through a head mounted display (HMD) worn by the user. The HMD may include a camera and one or more display panels. The HMD may capture an image of environment as perceived through the camera and display the image of the environment to the user with MR objects overlaid thereon. Unlike the transparent or semi-transparent surface of the AR/MR glasses, the one or more display panels of the HMD may not be transparent or semi-transparent. In VR, a user may experience a fully-immersive digital environment in which the real-world is blocked out. VR content may be experienced through a HMD.

FIG. 1 is a block diagram that illustrates an example content generation system 100 configured to implement one or more techniques of this disclosure. The content generation system 100 includes a device 104. The device 104 may include one or more components or circuits for performing various functions described herein. In some examples, one or more components of the device 104 may be components of a SOC. The device 104 may include one or more components configured to perform one or more techniques of this disclosure. In the example shown, the device 104 may include a processing unit 120, a content encoder/decoder 122, and a system memory 124. In some aspects, the device 104 may include a number of components (e.g., a communication interface 126, a transceiver 132, a receiver 128, a transmitter 130, a display processor 127, and one or more displays 131). Display(s) 131 may refer to one or more displays 131. For example, the display 131 may include a single display or multiple displays, which may include a first display and a second display. The first display may be a left-eye display and the second display may be a right-eye display. In some examples, the first display and the second display may receive different frames for presentment thereon. In other examples, the first and second display may receive the same frames for presentment thereon. In further examples, the results of the graphics processing may not be displayed on the device, e.g., the first display and the second display may not receive any frames for presentment thereon.

Instead, the frames or graphics processing results may be transferred to another device. In some aspects, this may be referred to as split-rendering.

The processing unit 120 may include an internal memory 121. The processing unit 120 may be configured to perform graphics processing using a graphics processing pipeline 107. The content encoder/decoder 122 may include an internal memory 123. In some examples, the device 104 may include a processor, which may be configured to perform one or more display processing techniques on one or more frames generated by the processing unit 120 before the frames are displayed by the one or more displays 131. While the processor in the example content generation system 100 is configured as a display processor 127, it should be understood that the display processor 127 is one example of the processor and that other types of processors, controllers, etc., may be used as substitute for the display processor 127. The display processor 127 may be configured to perform display processing. For example, the display processor 127 may be configured to perform one or more display processing techniques on one or more frames generated by the processing unit 120. The one or more displays 131 may be configured to display or otherwise present frames processed by the display processor 127. In some examples, the one or more displays 131 may include one or more of a liquid crystal display (LCD), a plasma display, an organic light emitting diode (OLED) display, a projection display device, an augmented reality display device, a virtual reality display device, a head-mounted display, or any other type of display device.

Memory external to the processing unit 120 and the content encoder/decoder 122, such as system memory 124, may be accessible to the processing unit 120 and the content encoder/decoder 122. For example, the processing unit 120 and the content encoder/decoder 122 may be configured to read from and/or write to external memory, such as the system memory 124. The processing unit 120 may be communicatively coupled to the system memory 124 over a bus. In some examples, the processing unit 120 and the content encoder/decoder 122 may be communicatively coupled to the internal memory 121 over the bus or via a different connection.

The content encoder/decoder 122 may be configured to receive graphical content from any source, such as the system memory 124 and/or the communication interface 126. The system memory 124 may be configured to store received encoded or decoded graphical content. The content encoder/decoder 122 may be configured to receive encoded or decoded graphical content, e.g., from the system memory 124 and/or the communication interface 126, in the form of encoded pixel data. The content encoder/decoder 122 may be configured to encode or decode any graphical content.

The internal memory 121 or the system memory 124 may include one or more volatile or non-volatile memories or storage devices. In some examples, internal memory 121 or the system memory 124 may include RAM, static random access memory (SRAM), dynamic random access memory (DRAM), erasable programmable ROM (EPROM), EEPROM, flash memory, a magnetic data media or an optical storage media, or any other type of memory. The internal memory 121 or the system memory 124 may be a non-transitory storage medium according to some examples. The term "non-transitory" may indicate that the storage medium is not embodied in a carrier wave or a propagated signal. However, the term "non-transitory" should not be interpreted to mean that internal memory 121 or the system memory 124 is non-movable or that its contents are static.

As one example, the system memory 124 may be removed from the device 104 and moved to another device. As another example, the system memory 124 may not be removable from the device 104.

The processing unit 120 may be a CPU, a GPU, a GPGPU, or any other processing unit that may be configured to perform graphics processing. In some examples, the processing unit 120 may be integrated into a motherboard of the device 104. In further examples, the processing unit 120 may be present on a graphics card that is installed in a port of the motherboard of the device 104, or may be otherwise incorporated within a peripheral device configured to inter-operate with the device 104. The processing unit 120 may include one or more processors, such as one or more microprocessors, GPUs, ASICs, FPGAs, arithmetic logic units (ALUs), DSPs, discrete logic, software, hardware, firmware, other equivalent integrated or discrete logic cir-cuitry, or any combinations thereof. If the techniques are implemented partially in software, the processing unit 120 may store instructions for the software in a suitable, non-transitory computer-readable storage medium, e.g., internal memory 121, and may execute the instructions in hardware using one or more processors to perform the techniques of this disclosure. Any of the foregoing, including hardware, software, a combination of hardware and software, etc., may be considered to be one or more processors.

The content encoder/decoder 122 may be any processing unit configured to perform content decoding. In some examples, the content encoder/decoder 122 may be inte-grated into a motherboard of the device 104. The content encoder/decoder 122 may include one or more processors, such as one or more microprocessors, application specific integrated circuits (ASICs), field programmable gate arrays (FPGAs), arithmetic logic units (ALUs), digital signal pro-cessors (DSPs), video processors, discrete logic, software, hardware, firmware, other equivalent integrated or discrete logic circuitry, or any combinations thereof. If the tech-niques are implemented partially in software, the content encoder/decoder 122 may store instructions for the software in a suitable, non-transitory computer-readable storage medium, e.g., internal memory 123, and may execute the instructions in hardware using one or more processors to perform the techniques of this disclosure. Any of the fore-going, including hardware, software, a combination of hard-ware and software, etc., may be considered to be one or more processors.

In some aspects, the content generation system 100 may include a communication interface 126. The communication interface 126 may include a receiver 128 and a transmitter 130. The receiver 128 may be configured to perform any receiving function described herein with respect to the device 104. Additionally, the receiver 128 may be config-ured to receive information, e.g., eye or head position information, rendering commands, and/or location informa-tion, from another device. The transmitter 130 may be configured to perform any transmitting function described herein with respect to the device 104. For example, the transmitter 130 may be configured to transmit information to another device, which may include a request for content. The receiver 128 and the transmitter 130 may be combined into a transceiver 132. In such examples, the transceiver 132 may be configured to perform any receiving function and/or transmitting function described herein with respect to the device 104.

Referring again to FIG. 1, in certain aspects, the process-ing unit 120 may include a feedback sampler 198 configured to assign each shading element in a set of shading elements associated with a geometry unit to a corresponding shading element group in a set of shading element groups; identify whether each shading element in the set of shading elements is a visible shading element; calculate a group offset value for each shading element group in the set of shading element groups based on a number of visible shading elements in the set of shading elements; calculate an element offset value for each shading element within each of the shading element groups based on a number of visible shading elements in the shading element group; and allocate, based on the element offset value for each shading element within each of the shading element groups and the group offset value for each shading element group in the set of shading element groups, texture memory to the visible shading elements in each of the shading element groups. Although the following descrip-tion may be focused on graphics processing, the concepts described herein may be applicable to other similar process-ing techniques. Furthermore, although the following description may be focused on split XR rendering, the techniques described herein may also be applicable to (non-XR) split rendering.

A device, such as the device 104, may refer to any device, apparatus, or system configured to perform one or more techniques described herein. For example, a device may be a server, a base station, a user equipment, a client device, a station, an access point, a computer such as a personal computer, a desktop computer, a laptop computer, a tablet computer, a computer workstation, or a mainframe com-puter, an end product, an apparatus, a phone, a smart phone, a server, a video game platform or console, a handheld device such as a portable video game device or a personal digital assistant (PDA), a wearable computing device such as a smart watch, an augmented reality device, or a virtual reality device, a non-wearable device, a display or display device, a television, a television set-top box, an intermediate network device, a digital media player, a video streaming device, a content streaming device, an in-vehicle computer, any mobile device, any device configured to generate graphical content, or any device configured to perform one or more techniques described herein. Processes herein may be described as performed by a particular component (e.g., a GPU) but in other embodiments, may be performed using other components (e.g., a CPU) consistent with the disclosed embodiments.

GPUs can process multiple types of data or data packets in a GPU pipeline. For instance, in some aspects, a GPU can process two types of data or data packets, e.g., context register packets and draw call data. A context register packet can be a set of global state information, e.g., information regarding a global register, shading program, or constant data, which can regulate how a graphics context will be processed. For example, context register packets can include information regarding a color format. In some aspects of context register packets, there can be a bit or bits that indicate which workload belongs to a context register. Also, there can be multiple functions or programming running at the same time and/or in parallel. For example, functions or programming can describe a certain operation, e.g., the color mode or color format. Accordingly, a context register can define multiple states of a GPU.

Context states can be utilized to determine how an indi-vidual processing unit functions, e.g., a vertex fetcher (VFD), a vertex shader (VS), a shader processor, or a geometry processor, and/or in what mode the processing unit functions. In order to do so, GPUs can use context registers and programming data. In some aspects, a GPU can generate a workload, e.g., a vertex or pixel workload, in the pipeline based on the context register definition of a mode or state. Certain processing units, e.g., a VFD, can use these states to determine certain functions, e.g., how a vertex is assembled. As these modes or states can change, GPUs may need to change the corresponding context. Additionally, the workload that corresponds to the mode or state may follow the changing mode or state.

Figure 2:
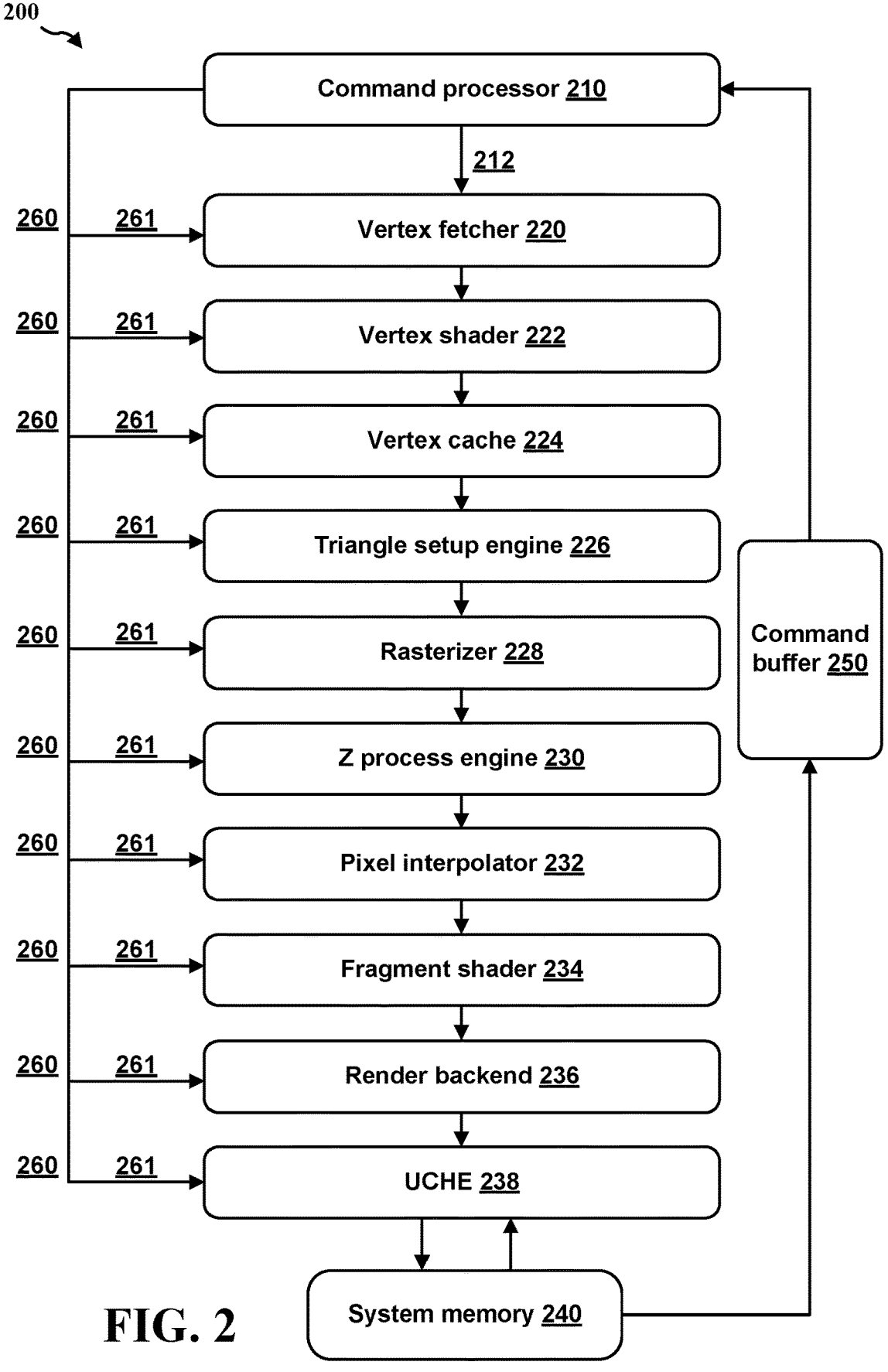
FIG. 2 illustrates an example graphics processor (e.g., a graphics processing unit (GPU)) in accordance with one or more techniques of this disclosure.

FIG. 2 illustrates an example GPU 200 in accordance with one or more techniques of this disclosure. As shown in FIG. 2, GPU 200 includes command processor (CP) 210, draw call packets 212, VFD 220, VS 222, vertex cache (VPC) 224, triangle setup engine (TSE) 226, rasterizer (RAS) 228, Z process engine (ZPE) 230, pixel interpolator (PI) 232, fragment shader (FS) 234, render backend (RB) 236, L2 cache (UCHE) 238, and system memory 240. Although FIG. 2 displays that GPU 200 includes processing units 220-238, GPU 200 can include a number of additional processing units. Additionally, processing units 220-238 are merely an example and any combination or order of processing units can be used by GPUs according to the present disclosure. GPU 200 also includes command buffer 250, context register packets 260, and context states 261.

As shown in FIG. 2, a GPU can utilize a CP, e.g., CP 210, or hardware accelerator to parse a command buffer into context register packets, e.g., context register packets 260, and/or draw call data packets, e.g., draw call packets 212. The CP 210 can then send the context register packets 260 or draw call packets 212 through separate paths to the processing units or blocks in the GPU. Further, the command buffer 250 can alternate different states of context registers and draw calls. For example, a command buffer can simultaneously store the following information: context register of context N, draw call(s) of context N, context register of context N+1, and draw call(s) of context N+1.

GPUs can render images in a variety of different ways. In some instances, GPUs can render an image using direct rendering and/or tiled rendering. In tiled rendering GPUs, an image can be divided or separated into different sections or tiles. After the division of the image, each section or tile can be rendered separately. Tiled rendering GPUs can divide computer graphics images into a grid format, such that each portion of the grid, i.e., a tile, is separately rendered. In some aspects of tiled rendering, during a binning pass, an image can be divided into different bins or tiles. In some aspects, during the binning pass, a visibility stream can be constructed where visible primitives or draw calls can be identified. A rendering pass may be performed after the binning pass. In contrast to tiled rendering, direct rendering does not divide the frame into smaller bins or tiles. Rather, in direct rendering, the entire frame is rendered at a single time (i.e., without a binning pass). Additionally, some types of GPUs can allow for both tiled rendering and direct rendering (e.g., flex rendering).

In some aspects, GPUs can apply the drawing or rendering process to different bins or tiles. For instance, a GPU can render to one bin, and perform all the draws for the primitives or pixels in the bin. A pixel may refer to a smallest addressable element in a raster image. During the process of rendering to a bin, the render targets can be located in GPU internal memory (GMEM). In some instances, after rendering to one bin, the content of the render targets can be moved to a system memory and the GMEM can be freed for rendering the next bin. Additionally, a GPU can render to another bin, and perform the draws for the primitives or pixels in that bin. Therefore, in some aspects, there might be a small number of bins, e.g., four bins, that cover all of the draws in one surface. Further, GPUs can cycle through all of the draws in one bin, but perform the draws for the draw calls that are visible, i.e., draw calls that include visible geometry. In some aspects, a visibility stream can be generated, e.g., in a binning pass, to determine the visibility information of each primitive in an image or scene. For instance, this visibility stream can identify whether a certain primitive is visible or not. In some aspects, this information can be used to remove primitives that are not visible so that the non-visible primitives are not rendered, e.g., in the rendering pass. Also, at least some of the primitives that are identified as visible can be rendered in the rendering pass.

In some aspects of tiled rendering, there can be multiple processing phases or passes. For instance, the rendering can be performed in two passes, e.g., a binning, a visibility or bin-visibility pass and a rendering or bin-rendering pass. During a visibility pass, a GPU can input a rendering workload, record the positions of the primitives or triangles, and then determine which primitives or triangles fall into which bin or area. In some aspects of a visibility pass, GPUs can also identify or mark the visibility of each primitive or triangle in a visibility stream. During a rendering pass, a GPU can input the visibility stream and process one bin or area at a time. In some aspects, the visibility stream can be analyzed to determine which primitives, or vertices of primitives, are visible or not visible. As such, the primitives, or vertices of primitives, that are visible may be processed. By doing so, GPUs can reduce the unnecessary workload of processing or rendering primitives or triangles that are not visible.

In some aspects, during a visibility pass, certain types of primitive geometry, e.g., position-only geometry, may be processed. Additionally, depending on the position or location of the primitives or triangles, the primitives may be sorted into different bins or areas. In some instances, sorting primitives or triangles into different bins may be performed by determining visibility information for these primitives or triangles. For example, GPUs may determine or write visibility information of each primitive in each bin or area, e.g., in a system memory. This visibility information can be used to determine or generate a visibility stream. In a rendering pass, the primitives in each bin can be rendered separately. In these instances, the visibility stream can be fetched from memory and used to remove primitives which are not visible for that bin.

Some aspects of GPUs or GPU architectures can provide a number of different options for rendering, e.g., software rendering and hardware rendering. In software rendering, a driver or CPU can replicate an entire frame geometry by processing each view one time. Additionally, some different states may be changed depending on the view. As such, in software rendering, the software can replicate the entire workload by changing some states that may be utilized to render for each viewpoint in an image. In certain aspects, as GPUs may be submitting the same workload multiple times for each viewpoint in an image, there may be an increased amount of overhead. In hardware rendering, the hardware or GPU may be responsible for replicating or processing the geometry for each viewpoint in an image. Accordingly, the hardware can manage the replication or processing of the primitives or triangles for each viewpoint in an image.

Figure 3:
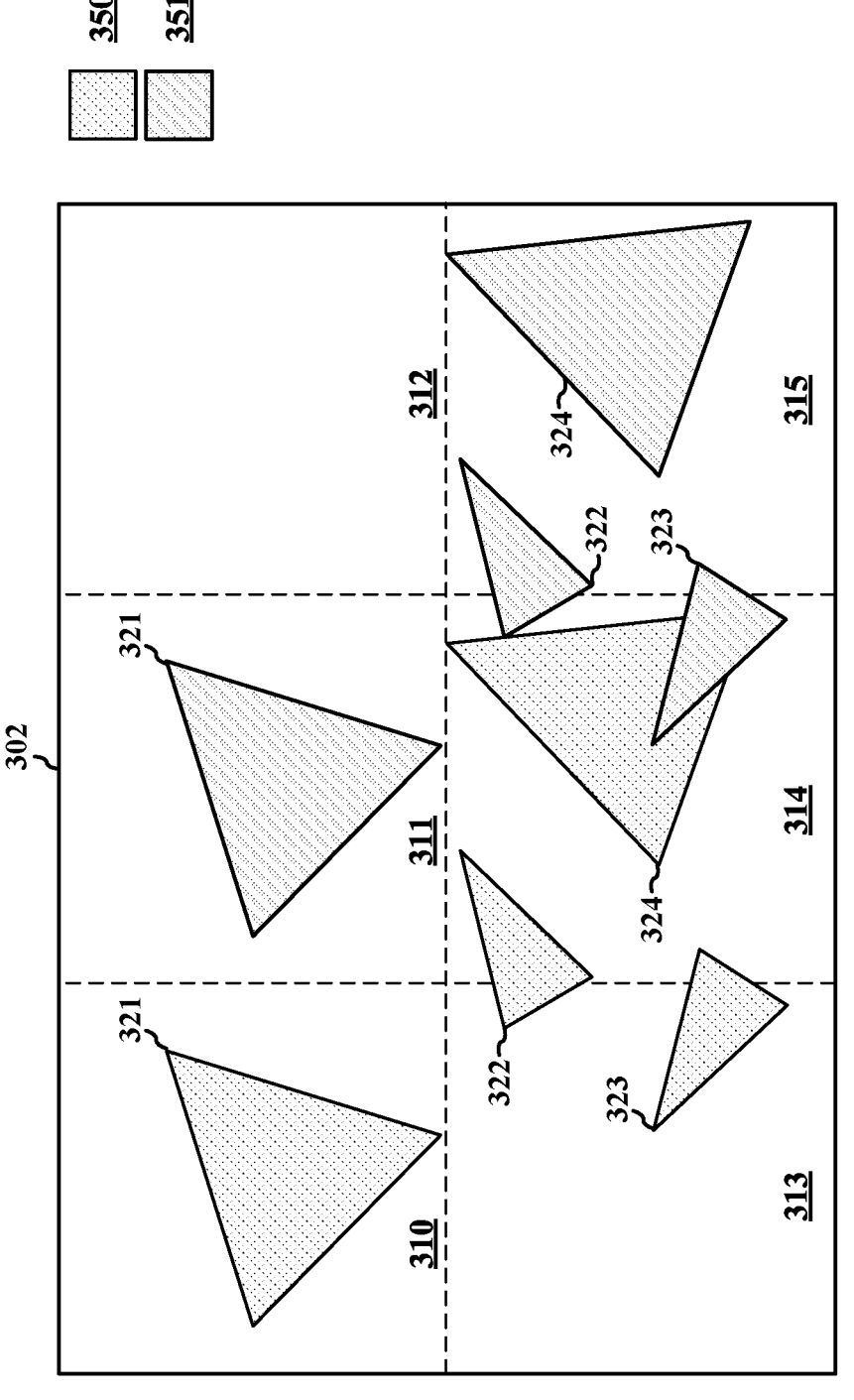
FIG. 3 illustrates an example image or surface in accordance with one or more techniques of this disclosure.

FIG. 3 illustrates image or surface 300, including multiple primitives divided into multiple bins in accordance with one or more techniques of this disclosure. As shown in FIG. 3, image or surface 300 includes area 302, which includes primitives 321, 322, 323, and 324. The primitives 321, 322, 323, and 324 are divided or placed into different bins, e.g., bins 310, 311, 312, 313, 314, and 315. FIG. 3 illustrates an example of tiled rendering using multiple viewpoints for the primitives 321-324. For instance, primitives 321-324 are in first viewpoint 350 and second viewpoint 351. As such, the GPU processing or rendering the image or surface 300 including area 302 can utilize multiple viewpoints or multi-view rendering.

As indicated herein, GPUs or graphics processors can use a tiled rendering architecture to reduce power consumption or save memory bandwidth. As further stated above, this rendering method can divide the scene into multiple bins, as well as include a visibility pass that identifies the triangles that are visible in each bin. Thus, in tiled rendering, a full screen can be divided into multiple bins or tiles. The scene can then be rendered multiple times, e.g., one or more times for each bin.

In aspects of graphics rendering, some graphics applications may render to a single target, i.e., a render target, one or more times. For instance, in graphics rendering, a frame buffer on a system memory may be updated multiple times. The frame buffer can be a portion of memory or random access memory (RAM), e.g., containing a bitmap or storage, to help store display data for a GPU. The frame buffer can also be a memory buffer containing a complete frame of data. Additionally, the frame buffer can be a logic buffer. In some aspects, updating the frame buffer can be performed in bin or tile rendering, where, as discussed above, a surface is divided into multiple bins or tiles and then each bin or tile can be separately rendered. Further, in tiled rendering, the frame buffer can be partitioned into multiple bins or tiles.

As indicated herein, in some aspects, such as in bin or tiled rendering architecture, frame buffers can have data stored or written to them repeatedly, e.g., when rendering from different types of memory. This can be referred to as resolving and unresolving the frame buffer or system memory. For example, when storing or writing to one frame buffer and then switching to another frame buffer, the data or information on the frame buffer can be resolved from the GMEM at the GPU to the system memory, i.e., memory in the double data rate (DDR) RAM or dynamic RAM (DRAM).

In some aspects, the system memory can also be system-on-chip (SoC) memory or another chip-based memory to store data or information, e.g., on a device or smart phone. The system memory can also be physical data storage that is shared by the CPU and/or the GPU. In some aspects, the system memory can be a DRAM chip, e.g., on a device or smart phone. Accordingly, SoC memory can be a chip-based manner in which to store data.

In some aspects, the GMEM can be on-chip memory at the GPU, which can be implemented by static RAM (SRAM). Additionally, GMEM can be stored on a device, e.g., a smart phone. As indicated herein, data or information can be transferred between the system memory or DRAM and the GMEM, e.g., at a device. In some aspects, the system memory or DRAM can be at the CPU or GPU. Additionally, data can be stored at the DDR or DRAM. In some aspects, such as in bin or tiled rendering, a small portion of the memory can be stored at the GPU, e.g., at the GMEM. In some instances, storing data at the GMEM may utilize a larger processing workload and/or consume more power compared to storing data at the frame buffer or system memory.

Figure 4:
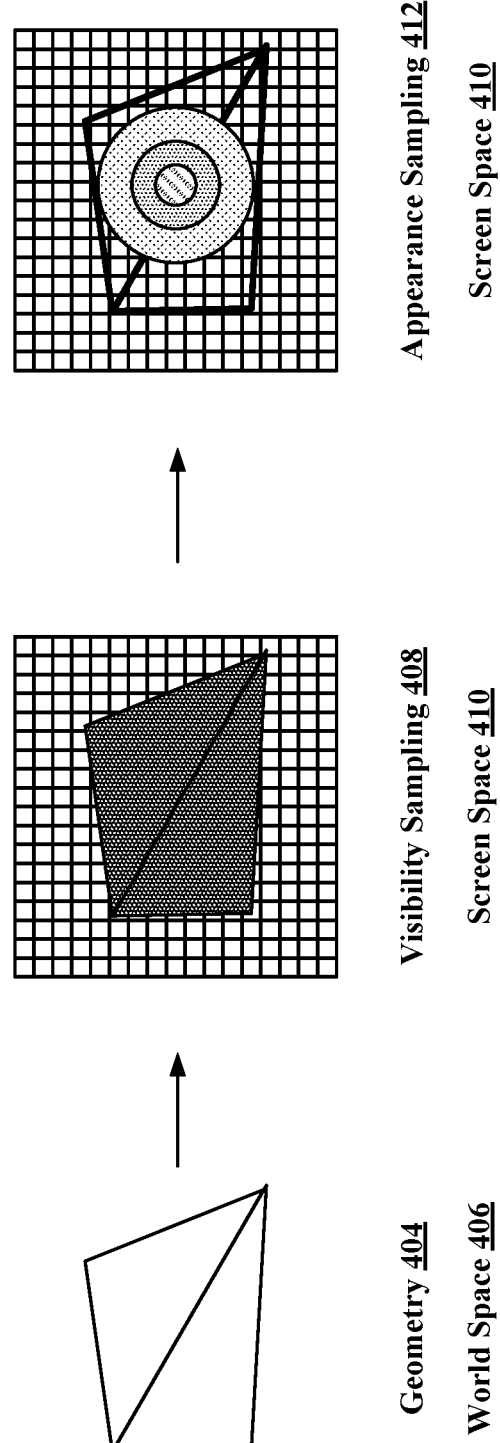
FIG. 4 is a diagram illustrating an example of a rasterization and shading process in accordance with one or more techniques of this disclosure.

FIG. 4 is a diagram 400 illustrating an example of a rasterization and shading process 402 in accordance with one or more techniques of this disclosure. An apparatus (e.g., the device 104, a graphics processor of the device 104, etc.) may render geometry 404 in a world space 406. The world space 406 may be a frame of reference in which everything in the world is located in absolute coordinates (e.g., three-dimensional (3D) coordinates). In an example, the geometry 404 may be part of graphical content that is to be displayed on a display (e.g., the display(s) 131)). In an example, the geometry 404 may be associated with a 3D scene.

The apparatus may perform visibility sampling 408 on the geometry 404. For instance, the apparatus may rasterize the geometry 404 and convert the geometry 404 to pixels in a screen space 410. The screen space 410 may refer to a space (i.e., a two-dimensional (2D)) space defined by a screen. The apparatus may then test the pixels for visibility.

The apparatus may perform appearance sampling 412 on visible pixels in the screen space 410. For instance, the apparatus may shade the pixels for appearance and perform depth testing on the pixels.

Figure 5:
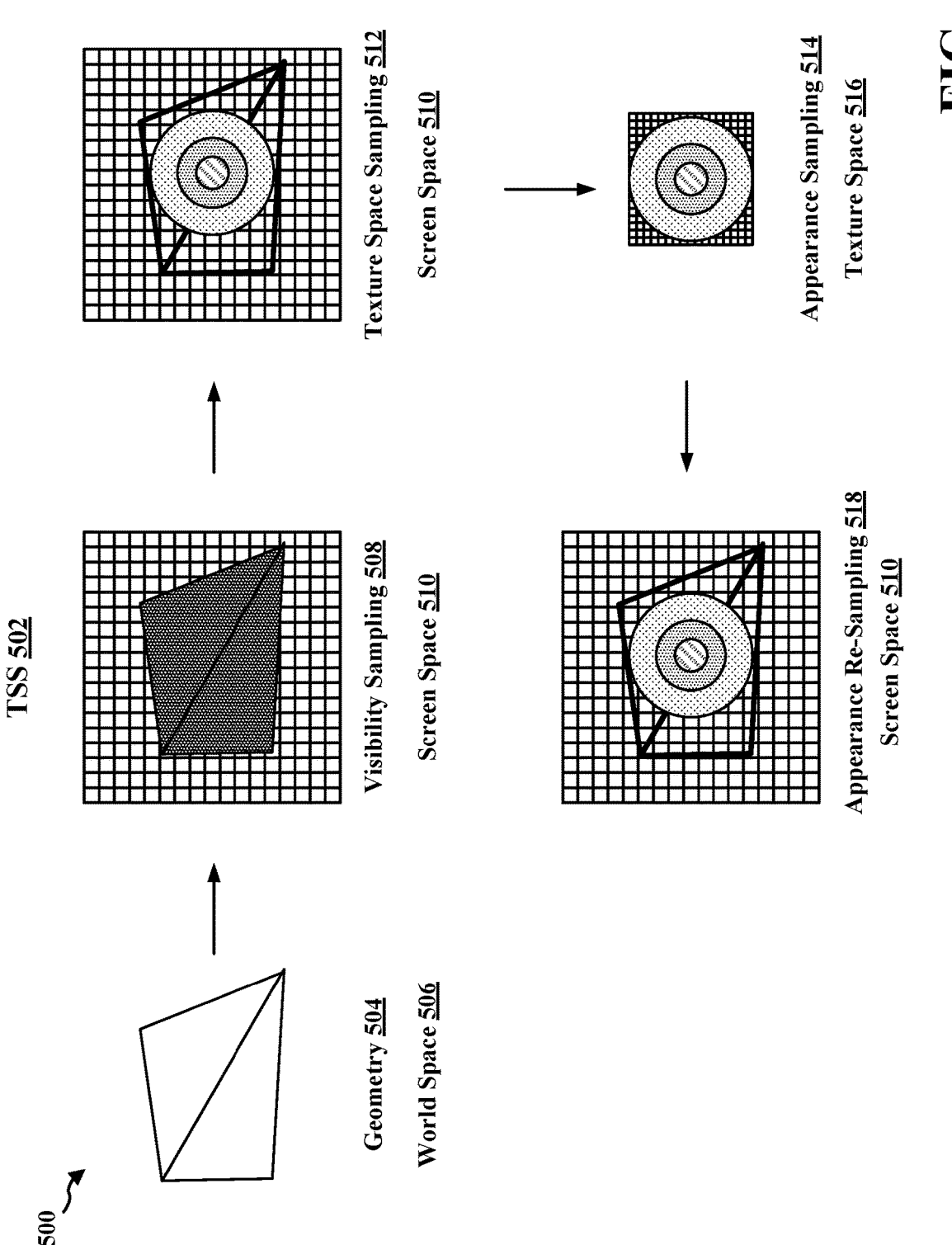
FIG. 5 is a diagram illustrating an example of texture space shading (TSS) in accordance with one or more techniques of this disclosure.

FIG. 5 is a diagram 500 illustrating an example of texture space shading (TSS) 502 in accordance with one or more techniques of this disclosure. TSS may refer to a shading process whereby shading values are dynamically computed and stored in a texture as texels in a texture space. Pixels in a screen space may be mapped into a texture space, where texels in the texture space may be sampled and filtered using texture lookup operations. A texel may refer to a fundamental unit of a texture (i.e., a texture map). A texel may also be referred to as a texture element or a texture pixel. A texture may be represented by an array of texels. Texture space may refer to a 2D domain in which object textures are described. Texture space may be parameterized by U and V coordinates. Texture space may be related to a 2D rasterization of a corresponding geometry of an object (described in 3D space) via texture mapping. In comparison to the rasterization and shading process 402, TSS may sample visibility and appearance at independent rates and in separate coordinate systems. As such, TSS may be associated with improved quality and performance in comparison to the rasterization and shading process 402 by reusing shading computations performed in a (decoupled) texture space.

In the TSS 502, geometry 504 may be described in a world space 506. The world space 506 may be a frame of reference in which everything in the world is located in absolute coordinates (e.g., 3D coordinates). In an example, the geometry 504 may be part of graphical content that is to be displayed on a display (e.g., the display(s) 131)). In an example, the geometry 504 may be associated with a 3D scene.

The apparatus may perform visibility sampling 508 on the geometry 504. For instance, the apparatus may rasterize the geometry 504 and convert the geometry 504 to pixels in a screen space 510. The screen space 510 may refer to a space (i.e., a 2D space) defined by a view (camera pose) and camera parameters. The apparatus may then test the pixels for visibility. The visibility sampling 508 may be included in a visibility stage of a graphics pipeline.

The apparatus may perform texture space sampling 512 in the screen space 510. With more particularity, the apparatus may map a footprint of the screen space 510 into a texture space 516. The apparatus may perform appearance sampling 514 in the texture space 516. For instance, the apparatus may shade the texels in the texture space 516 for appearance and perform depth testing on the texels. The apparatus may perform appearance re-sampling 518 on the (shaded) texels in the texture space 516 in order to obtain screen space pixels. Similar to appearance sampling, appearance re-sampling may refer to a shading process.

Figure 6:
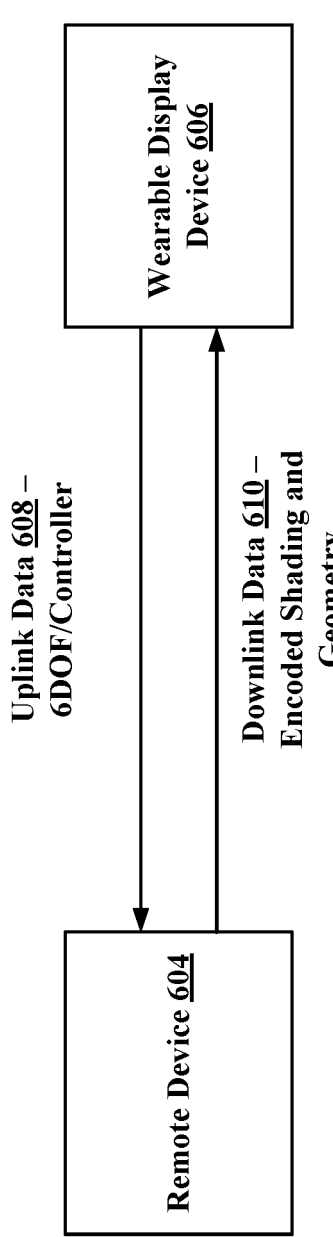
FIG. 6 is a diagram illustrating an example of split extended reality (XR) rendering in accordance with one or more techniques of this disclosure.
Figure 6:
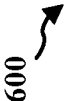

FIG. 6 is a diagram 600 illustrating an example of split XR rendering 602 in accordance with one or more techniques of this disclosure. Split XR rendering may refer to a rendering paradigm whereby a first portion of XR rendering tasks (or other tasks) for XR content are performed by a remote device 604 and a second portion of XR rendering tasks (or other tasks) for the XR content are performed by a wearable display device 606. The final rendered content may be presented on a display of the wearable display device 606. In general, the remote device 604 may possess relatively greater computational capabilities than computational capabilities of the wearable display device 606. For instance, the remote device 604 may have a greater amount of memory, a faster processor(s), etc. in comparison to memory and processor(s) of the wearable display device 606. In an example, the remote device 604 may be a server, a video game console, a desktop computing device, or a mobile computing device such as a laptop computing device, a tablet computing device, or a smartphone. In an example, the remote device 604 may be or include the device 104. In an example, the wearable display device 606 may be XR glasses, an HMD, or a smartphone. In an example, the wearable display device 606 may be or include the device 104. The remote device 604 and the wearable display device 606 may communicate over a wired connection and/or a wireless connection. In an example, the wired connection may be or include an Ethernet connection and/or a universal serial bus (USB) connection. In an example, the wireless connection may be or include a 5G New Radio (NR) connection, a Bluetooth™ (Bluetooth is a trademark of the Bluetooth Special Interest Group (SIG)) connection, and/or a wireless local area network (WLAN) connection, such as a Wi-Fi™ (Wi-Fi is a trademark of the Wi-Fi Alliance) connection based on the Institute of Electrical and Electronics Engineers (IEEE) 802.11 standard.

In an example, the wearable display device 606 may transmit uplink data 608 to the remote device 604, where the uplink data 608 may include six degrees of freedom (6DOF) pose information (i.e., translation information and rotation information) of the wearable display device 606, and where the 6DOF pose information may be associated with a controller of the wearable display device 606. The remote device 604 may receive the uplink data 608. The remote device 604 may perform shading and geometry operations based on the uplink data 608. The remote device 604 may transmit downlink data 610 to the wearable display device 606, where the downlink data 610 may include the encoded shading and geometry. In one aspect, the downlink data 610 may be associated with 2.5 dimensional (2.5D) information, where the 2.5D information may include 2D information and depth information. In another example, the downlink data 610 may be associated with 3D information. The wearable display device 606 may receive the downlink data 610. The wearable display device 606 may perform additional processing (e.g., a late stage reprojection) based on the downlink data 610 and the wearable display device 606 may present content (e.g., XR content) on a display panel based on the (processed) downlink data 610.

In one aspect, the remote device 604 may "respond" to the wearable display device 606 with different latencies depending on characteristics of an application being executed by the wearable display device 606. For instance, if the application is an automotive design application or an architectural design application, the remote device 604 may respond with a latency within a certain latency range (e.g., a range of 50-100 milliseconds (ms)). In another example, if the application is a gaming application, the remote device 604 may respond with a latency that ranges from 10-20 ms. In one aspect, the split XR rendering 602 may be associated with stochastic rendering, such as hybrid ray tracing and path tracing. In another aspect, the split XR rendering 602 may be associated with stereo rendering.

The split XR rendering 602 may utilize TSS (e.g., the TSS 502) in order to improve performance. In one example, via TSS, redundant lighting calculations may be skipped, which may conserve computing resource of the remote device 604 and/or the wearable display device 606. For instance, via TSS, lighting calculations may be used within the same frame and/or across frames. In another example, as a shading rate may be decoupled from a rasterization rate in TSS, performance and quality may be dynamically adjusted with a sampler bias. In yet another example, TSS may remove shimmer artifacts associated with rendering of far objects.

Split rendering (e.g., the split XR rendering 602) may include 2D split rendering, 2.5D split rendering (e.g., image based rendering), 3D split rendering, or hybrid split rendering. 2D split rendering may also be referred to as pixel streaming. 2.5D split rendering may include transmitting 2D information as well as depth information. 2.5D split rendering may enable parallax correction. Parallax correction may refer to correcting for translation on a user side (e.g., on a side of a wearable display device). Parallax correction may reduce artifacts and judder in a displayed image. 3D split rendering may be associated with transmitting full 3D geometry information. 2.5D split rendering may enable parallax correction and 3D split rendering may enable parallax correction and disocclusion handling. Hybrid split rendering may refer to a scenario in which a full version of an application is executed on a remote device and on a wearable display device, where the remote device and the wearable display device are rendering cooperatively.

Figure 7:
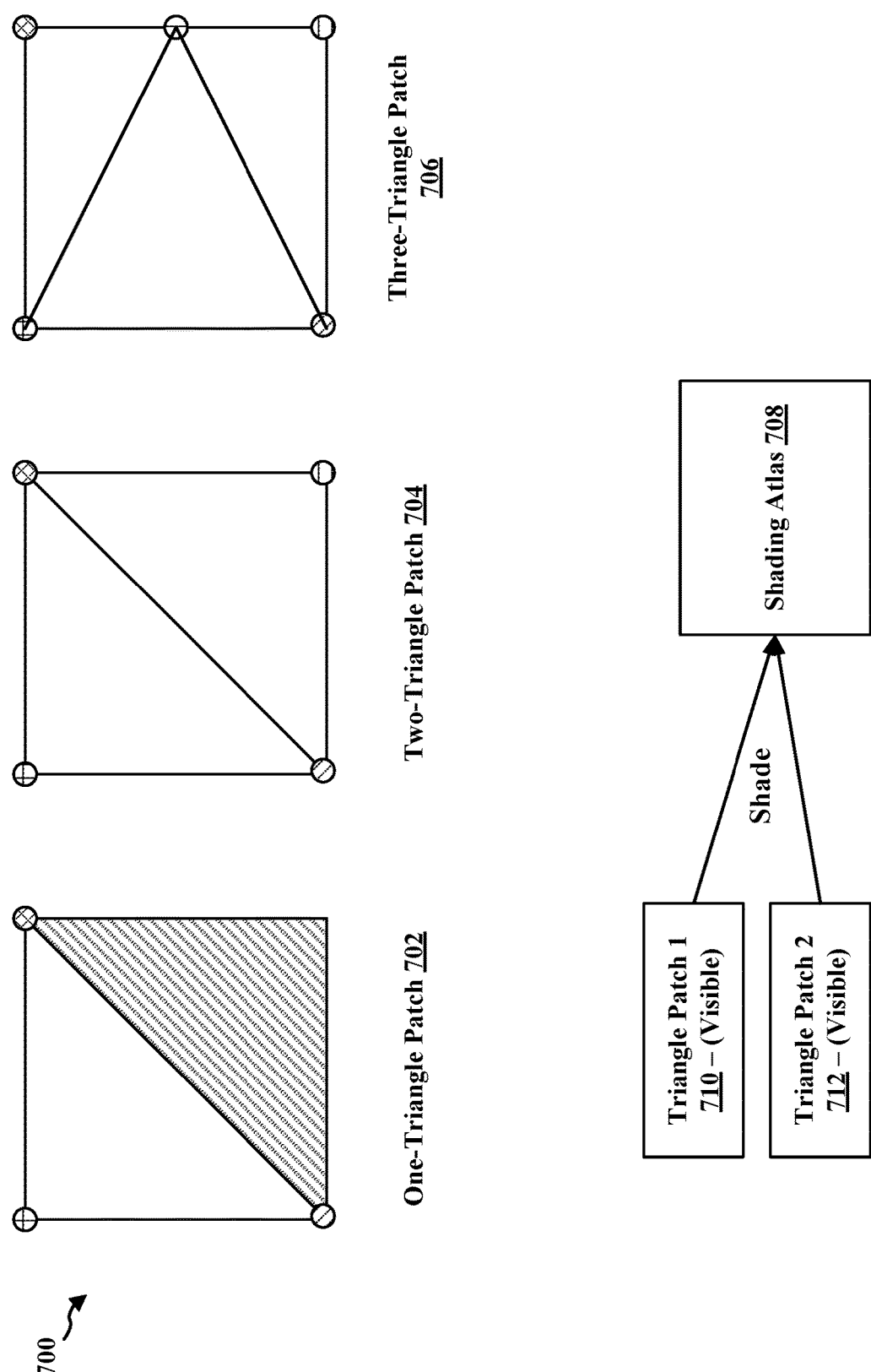
FIG. 7 is a diagram illustrating example aspects of a shading atlas in accordance with one or more techniques of this disclosure.

FIG. 7 is a diagram 700 illustrating example aspects of a shading atlas 708 in accordance with one or more techniques of this disclosure. A shading atlas may refer to a 2D data structure that includes shading information of visible surfaces corresponding to rendered scenes. The shading atlas 708 may also be referred to as a texture atlas. A device (e.g., the device 104) may render (e.g., for framerate upsampling and warping) different views of close viewpoints based on the shading atlas 708. Aspects presented herein may utilize the shading atlas 708 in order to provide for improved TSS.

As described above in connection with the visibility sampling 508, in a visibility stage, a device (e.g., the device 104) may determine visible geometry in a scene that is to be shaded. In an example, a unit for determining visibility for geometry may be referred to as a patch, where the patch may include one or more adjacent triangles. The patch may be suitable for being packed into a texture for streaming; however, triangles associated with a relatively large screen space projection may be under-sampled when shaded in an atlas space, which may result in blurry textures. A device may assign triangles to patches based on a heuristic. During the visibility stage, the device may render a patch identifier (ID) buffer with a depth buffer enabled. During a subsequent compute pass, the device may mark patches in the patch ID buffer as visible. In an example, a patch may be a one-triangle patch 702 that includes one triangle, a two-triangle patch 704 that includes two triangles, or a three-triangle patch 706 that includes three triangles.

During a shading stage (e.g., a stage associated with the appearance sampling 514), the device may shade visible patches into the shading atlas 708. In an example, during the visibility stage, the device may assign triangles into a first triangle patch 710, a second triangle patch 712, and a third triangle patch 714 and the device may determine that the first triangle patch 710 and the second triangle patch 712 are visible and that the third triangle patch 714 is not visible. In an example, the first triangle patch 710, the second triangle patch 712, and the third triangle patch 714 may be or include the one-triangle patch 702, the two-triangle patch 704, and/or the three-triangle patch 706. During the shading stage, the device may shade the first triangle patch 710 and the second triangle patch 712 into the shading atlas 708 based on the first triangle patch 710 and the second triangle patch 712 being visible.

Figure 8:
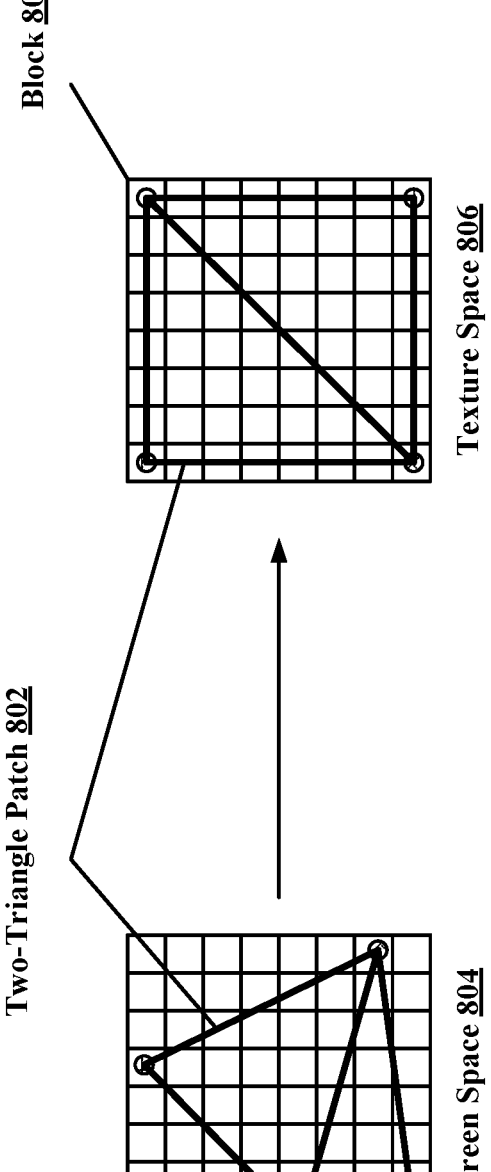
FIG. 8 is a diagram illustrating further example aspects of a shading atlas in accordance with one or more techniques of this disclosure.

FIG. 8 is a diagram 800 illustrating further example aspects of a shading atlas in accordance with one or more techniques of this disclosure. As described above in the description of FIG. 7, a device (e.g., the device 104) may pack one, two, or three adjacent triangles into patches (e.g., the one-triangle patch 702, the two-triangle patch 704, the three-triangle patch 706). Atlas operations, such as memory allocation, memory deallocation, and shading operations may be performed on (whole) patches. The device may pack the patches into the shading atlas 708 as blocks, where each block may include shading information corresponding to a patch. Shading information in the shading atlas 708 may be obtained via storing a patch ID for each triangle associated with the shading atlas 708. Furthermore, each patch may include an identifier for a block in the shading atlas 708.

FIG. 8 depicts a two-triangle patch 802 (e.g., the two-triangle patch 704) in a screen space 804. The device may map the two-triangle patch 802 from the screen space 804 to a block 808 in a texture space 806 associated with the shading atlas 708. The block 808 may have a rectangular format, where each side of the block 808 may correspond to a power of two. Vertices of triangles in the two-triangle patch may be inset by half a pixel from an edge of the block 808 in order to facilitate bilinear interpolation in the shading atlas 708 without results being influenced by adjacent blocks. The shading information included in the block may be updated in each frame in set of frames.

Figure 9:
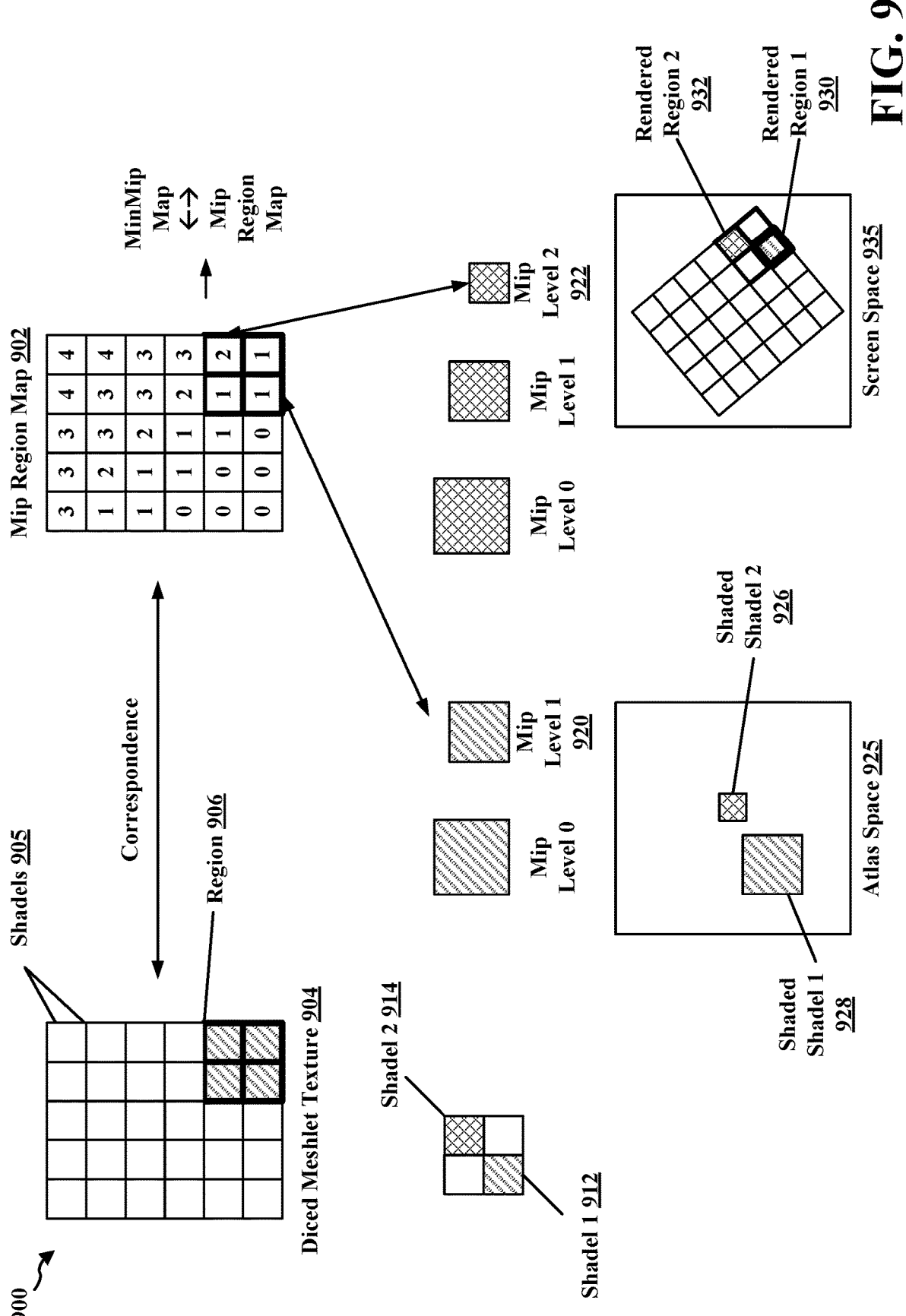
FIG. 9 is a diagram illustrating example aspects of a mip region map in accordance with one or more techniques of this disclosure.

FIG. 9 is a diagram 900 illustrating example aspects of a multum in parvo (mip) region map 902 in accordance with one or more techniques of this disclosure. The mip region map 902 may be associated with texture space shading (i.e., texture space shading used in real time rendering). A mip region map may refer to a 2D map indicating minimum (lowest) mip levels for regions of a texture. Each element in the map may be an unsigned integer indicating minimum mip values. A resolution of a mip region map (i.e., "MipRegionMapResolution") may refer to the number of regions associated with the mip region map, or equivalently the number of unsigned integers in the mip region map. The mip region map may also be referred to as a MinMip map. In one aspect, a resolution of a mip region map may refer to a number of regions that a meshlet is diced into, which may indicate a height-by-width of the mip region map. Numbers in the mip region map 902 may correspond to a mip level. For example, "0" may correspond to a mip level of "0," "1" may correspond to a mip level of "1," etc. Different mip levels may correspond to different resolutions.

A device (e.g., the device 104) may generate the mip region map 902. With more particularity, the device may determine a minmip map resolution for a texture (i.e., a meshlet texture) that is to be shaded. The device may dice the texture (described in greater detail below) to obtain a diced meshlet texture 904, where the diced meshlet texture 904 may include shadels 905 (described in greater detail below). In an example, the diced meshlet texture 904 may include thirty shadels. In an example, the diced meshlet texture 904 may include a region 906 that includes 2×2 shadels. The device may determine which shadels are visible in the region 906 (as well as other regions). As the diced meshlet texture 904 corresponds to the mip region map 902, the device may determine a mip level for shading each visible region of the diced meshlet texture 904, that is, the device may determine a mip level for shading the first shadel 912 and the second shadel 914. As depicted in FIG. 9, the device may determine a first mip level 920 for the first shadel 912 using the mip region map 902. The device may also determine a second mip level 922 for the second shadel 914 using the mip region map 902.

The device may shade the first shadel 912 at the first mip level 920 in an atlas space 925 to produce a first shaded shadel 928. The device may shade the second shadel 914 at the second mip level 922 in the atlas space 925 to produce a second shaded shadel 926. The atlas space 925 may be associated with a shading atlas (e.g., the shading atlas 708). The first shaded shadel 928 may map to a first rendered region 930 in a screen space 935, where the first rendered region 930 may include one or multiple pixels. The second shaded shadel 926 may map to a second rendered region 932 in the screen space 935, where the second rendered region 932 may include one or more multiple pixels. In an example, the first rendered region 930 may appear larger than the second rendered region 932 due to the first rendered region 930 being closer to a camera than the second rendered region 932.

As described above, TSS may be based on an assumption that a texture resolution is similar (e.g., within a threshold resolution range) of a screen resolution due to shading being performed at a screen sampling rate. However, this assumption may not be true in some cases. For instance, in cases of texture tiling and procedural texturing, the texture resolution may not be similar to the screen resolution. Texture tiling may refer to repeating a relatively small tiled texture multiple times (with some procedural generation to break a pattern) over an object in order to reduce an amount of texturing performed. Procedural texturing may refer to generating a texture from a shader without utilizing an underlying texture. Additionally, TSS may utilize a precomputed triangle ID texture. The precomputed triangle ID texture may be associated with a relatively large amount of texture memory.

Figure 10:
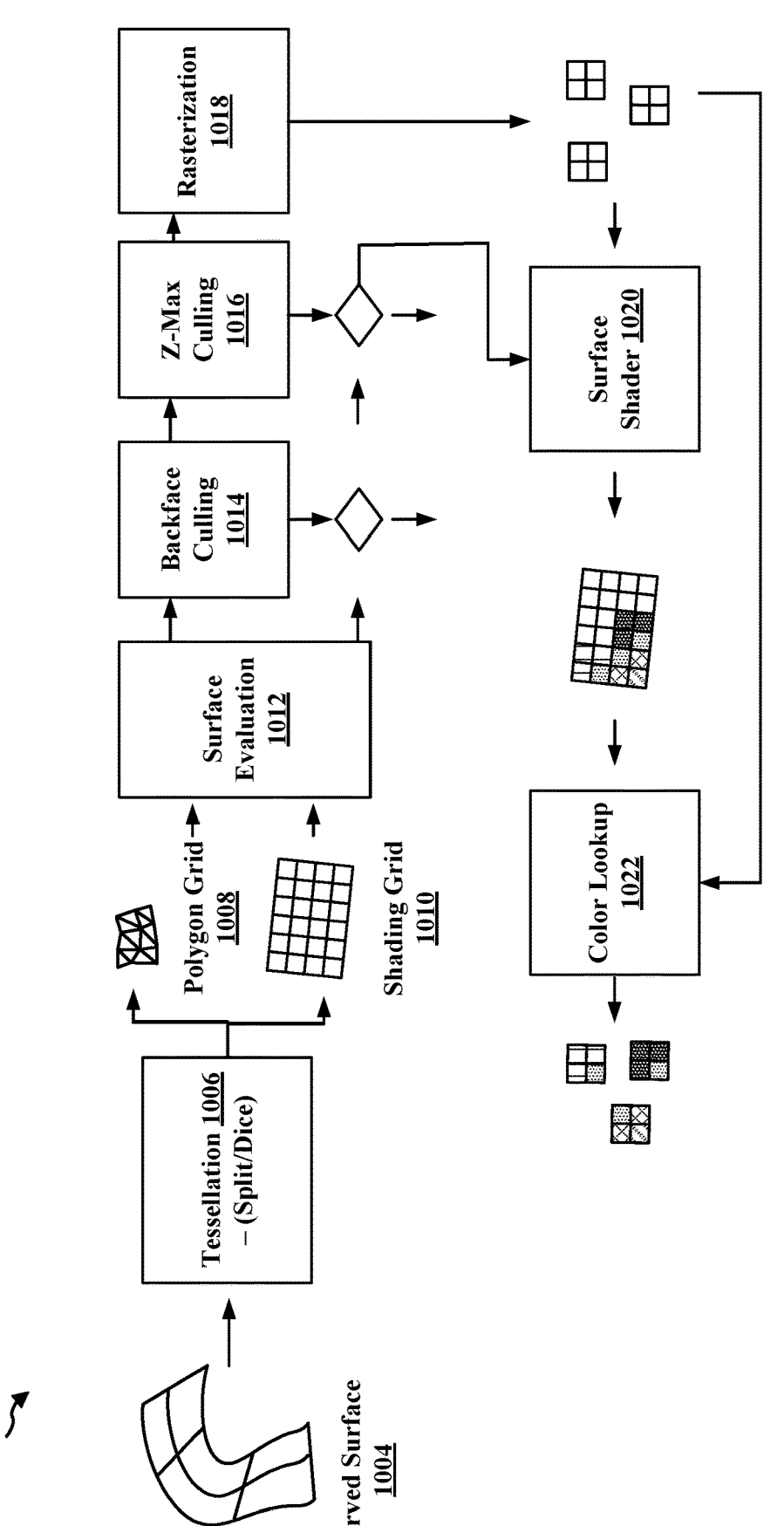
FIG. 10 is a diagram illustrating example aspects of a Reyes rendering pipeline in accordance with one or more techniques of this disclosure.

FIG. 10 is a diagram 1000 illustrating example aspects of a Reyes rendering pipeline 1002 in accordance with one or more techniques of this disclosure. The Reyes rendering pipeline 1002 may refer to a computer software architecture used in 3D computer graphics to render photo-realistic images. The Reyes rendering pipeline 1002 may be associated with film rendering (i.e., production rendering). Aspects presented herein may utilize elements of the Reyes rendering pipeline in non-film contexts, such as in an XR context. Reyes rendering may also be referred to as "Renders Everything You Ever Saw."

In the Reyes rendering pipeline 1002, a curved surface 1004 (i.e., a parametric surface) may be obtained. Tessellation 1006 (i.e., splitting and dicing) may be performed on the curved surface 1004 in order to obtain a polygon grid 1008 and a shading grid 1010. The dicing may aim to associate one tile with one screen pixel. Ray tracing may be performed on the polygon grid 1008 and shading may be performed in the shading grid 1010. The polygon grid 1008 and the shading grid 1010 may be at different resolutions. The polygon grid 1008 and the shading grid 1010 may undergo a surface evaluation 1012. Backface culling 1014, z-max culling 1016, and rasterization 1018 may be performed with respect to the polygon grid 1008 and/or the shading grid 1010. An output of the backface culling 1014, the z-max culling 1016, and the rasterization 1018 may be provided to a surface shader 1020 which may shade the shading grid 1010. A color lookup 1022 may be performed on an output of the rasterization 1018 and on an output of the surface shader 1020 in order to obtain a final output.

Figure 11:
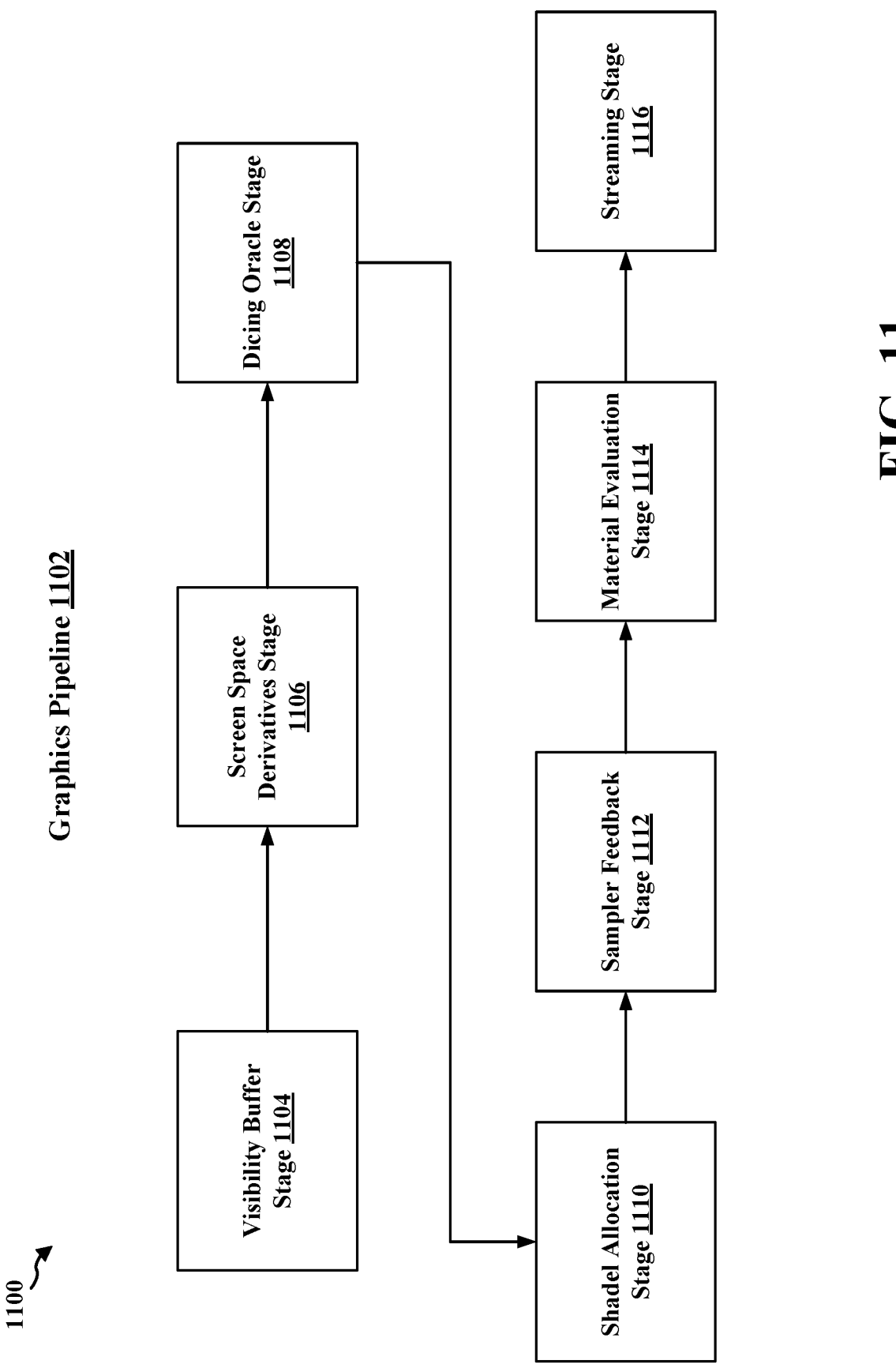
FIG. 11 is a diagram illustrating an example graphics pipeline in accordance with one or more techniques of this disclosure.

FIG. 11 is a diagram 1100 illustrating an example graphics pipeline 1102 in accordance with one or more techniques of this disclosure. As will be described in greater detail below, the graphics pipeline 1102 may be associated with a Reyes style dicing oracle for texture space shading. For instance, a real-time dicing oracle may output a view-dependent mip region map for each visible meshlet in a scene. The view-dependent mip region map may be used for texture space shading. The view-dependent mip region map may enable TSS to be performed when a texture resolution does not match a screen resolution. The view-dependent mip region map may also enable texture space shading to be performed when a unique texture mapping does not exist (i.e., texture space shading may be performed when triangles overlap in UV space). The graphics pipeline 1102 may also be associated with sampler feedback for texture space shading. The graphics pipeline 1102 may be associated with a process of translating "virtual" UV coordinates to "resident" (physical) texture coordinates. The graphics pipeline 1102 may further be associated with a process of material evaluation for texture space shading.

The graphics pipeline 1102 may include a visibility buffer stage 1104, a screen space derivatives stage 1106, a dicing oracle stage 1108, a shadel allocation stage 1110, a sampler feedback stage 1112, a material evaluation stage 1114, and a streaming stage 1116. In an example involving split rendering, the visibility buffer stage 1104, the screen space derivatives stage 1106, the dicing oracle stage 1108, the shadel allocation stage 1110, the sampler feedback stage 1112, and the material evaluation stage 1114 may be performed on a remote device (e.g., the remote device 604). In the example, during the streaming stage 1116, the remote device may transmit graphical content to a wearable display device (e.g., the wearable display device 606), where the graphical content may be based on the visibility buffer stage 1104, the screen space derivatives stage 1106, the dicing oracle stage 1108, the shadel allocation stage 1110, the sampler feedback stage 1112, and the material evaluation stage 1114. The wearable display device may present the graphical content on a display (e.g., the display(s) 131).

Figure 12:
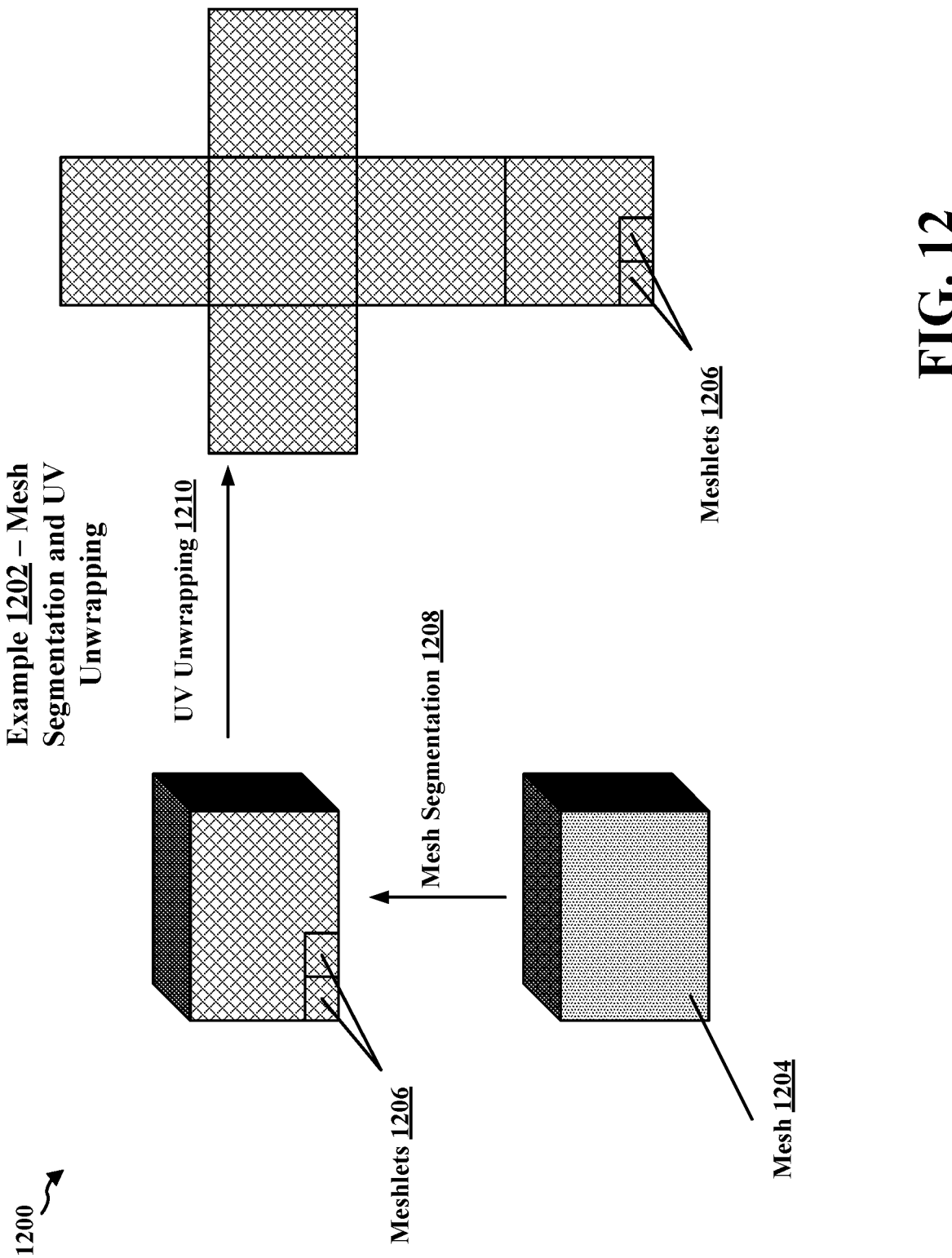
FIG. 12 is a diagram illustrating an example of mesh segmentation and UV unwrapping in accordance with one or more techniques of this disclosure.

FIG. 12 is a diagram 1200 illustrating an example 1202 of mesh segmentation and UV unwrapping in accordance with one or more techniques of this disclosure. Prior to the visibility buffer stage 1104 (i.e., offline), a device may obtain a mesh 1204 associated with each element (i.e. object) in a 3D scene. The mesh 1204 may be a 3D object. A mesh may refer to a collection of vertices, edges, and faces that define a shape of a polyhedral object.

Prior to the visibility buffer stage 1104 (i.e., offline), the device may then segment the mesh 1204 into meshlets 1206 by performing a mesh segmentation 1208 on the mesh 1204. A meshlet may refer to a group of triangles in a mesh. In an example, the group of triangles that form a meshlet may be connected (i.e., the group of triangles may correspond to a connected graph) and there may be a target (i.e., maximum) number of triangles in the meshlet. In an example, a meshlet may include 1 to 128 triangles. In a specific example, a meshlet may include 128 triangles. In an example, the mesh segmentation 1208 may be performed via a mesh segmentation algorithm, such as Nanite or hierarchical face clustering.

Prior to the visibility buffer stage 1104 (i.e., offline), the device may perform a UV unwrapping 1210 on the (segmented) mesh 1204. The UV unwrapping 1210 may flatten the (segmented) mesh 1204 into a 2D surface. "U" and the "V" in the UV unwrapping 1210 may refer to horizontal and vertical axes in 2D space. After the UV unwrapping the (flattened, segmented) mesh 1204 may be associated with UV coordinates. UV coordinates may be correspond to 2D surface coordinates associated with textures of a mesh. UV coordinates may be used to describe a topology of a surface in two dimensions, and may span values between zero and one. The UV unwrapping 1210 may also be referred to as a UV parameterization process. UV unwrapping may also be performed on a meshlet and may flatten a meshlet into a 2D surface. In an example for static geometry (i.e., non-changing topology at runtime), the UV unwrapping 1210 may be performed via a least-squares conformal mapping (LSCM) process. In an example for procedural geometry (i.e., changing topology at runtime), the UV unwrapping 1210 may be performed via an intrinsic parameterization, such as a mesh colors parameterization.

Referring back to FIG. 11, during the visibility buffer stage 1104, a device may determine geometry units (e.g., meshlets) that are visible in a current camera view via a visibility buffer (e.g., "VisibilityBuffer.Load (ScreenPos)"). The visibility buffer stage 1104 may store meshlet IDs and triangle IDs in a value (i.e., a single value), such as a 32-bit unsigned integer. In an example, (32-B) bits of the 32-bit unsigned integer may correspond to a meshlet ID and B bits of the 32-bit unsigned integer may correspond to a triangle ID, where B may be determined by a maximum number of triangles associated with any given meshlet. In an example B=7, meaning that the maximum number of triangles associated with a meshlet may be 128. The visibility buffer may be a thin geometry buffer (GBuffer) that includes triangle ID(s) and meshlet ID(s). A GBuffer may refer to a screen space representation of geometry and material information generated by an intermediate rendering pass in a deferred shading rendering pipeline.

During the screen space derivatives stage 1106, the device may compute screen space derivatives (e.g., "let UV, dUVdx, dUVdy=BarycentricInterpolation (VertexAttributes, ScreenPos"). The screen space derivatives may be indicative of properties on a surface. The screen space derivatives stage 1106 may include rendering a set of geometry units, which may include rasterizing the visibility buffer. Rasterization (i.e., rasterizing, a rasterization process) may refer to a technique of display 3D objects on a 2D screen. The screen space derivatives (which may be included in a set of derivatives) of a variable (or expression) "v" in a shader may be a difference in a value of "v" from one side of a 2×2 pixel quad to another side of the 2×2 pixel quad, that is, "ddx" may be a value of "v" in a right pixel minus a value of "v" in a left pixel, and similarly "ddy" may be a value of "v" in a top pixel minus a value of "v" in a bottom pixel. A shader may refer to programmable operations that execute for each vertex, control point, tessellated vertex, primitive, fragment, or workgroup in corresponding stage(s) of graphics and compute pipelines. A screen space derivative may be associated with a rate at which "v" increases or decreases while moving horizontally "ddx" or vertically "ddy" across a screen. A screen space derivative may approximate partial derivatives of a variable.

Computing the screen space derivatives may include performing a barycentric interpolation based on the visibility buffer and a screen position (i.e., a view). A barycentric coordinate system may refer to a coordinate system in which the location of a point is specified by reference to a simplex (a triangle for points in a plane, a tetrahedron for points in three-dimensional space, etc.). Barycentric coordinates of a point may be interpreted as masses placed at the vertices of the simplex, such that the point is the center of mass (or barycenter) of these masses. A barycentric interpolation may refer to performing an interpolation in a barycentric coordinate system. The screen space derivatives stage 1106 may further include performing a deferred attribute interpolation.

During the dicing oracle stage 1108 (e.g., "uint2 Dicin-gOracle (uint TargetPixels, float2 dUVdx, float2 dUVdy)," "let MipRegionMapResolution=DicingOracle (TargetPixel-sPerMipRegion, dUVdx, dUVdy)" and "InterlockedMax (RWMeshlets [MeshletID].MipRegionMapResolution, MipRegionMapResolution)"), the device may utilize the screen space derivatives and a target number of pixels (e.g., "TargetPixelsPerMipRegion: uint") to dice a mesh into shadels (i.e., shading elements, mip regions). During the shadel allocation stage 1110, the device may allocate memory to the shadels (e.g., allocate memory to the visible shadels). During the sampler feedback stage 1112, the device may determine fine-grained visibility as well as a shading rate (i.e., mip level) for every visible shadel. During the material evaluation stage 1114, the device may perform shading in the shading atlas by determining material type and vertex attributes associated with every texel, and by dispatching appropriate shaders to determine resulting texel content. During the material evaluation stage 1114, the device may perform depth equals testing in order to perform fast, early Z-like determinations on texels in a shadel that are to be shaded. During the streaming stage 1116, the device (e.g., a remote device) may stream a shaded texture to another device (e.g., a wearable display device). In one aspect, the visibility buffer stage 1104, the screen space derivatives stage 1106, the dicing oracle stage 1108, the shadel allocation stage 1110, the sampler feedback stage 1112, the material evaluation stage 1114, and the streaming stage 1116 may be performed on one device (i.e., local rendering).

Figure 13:
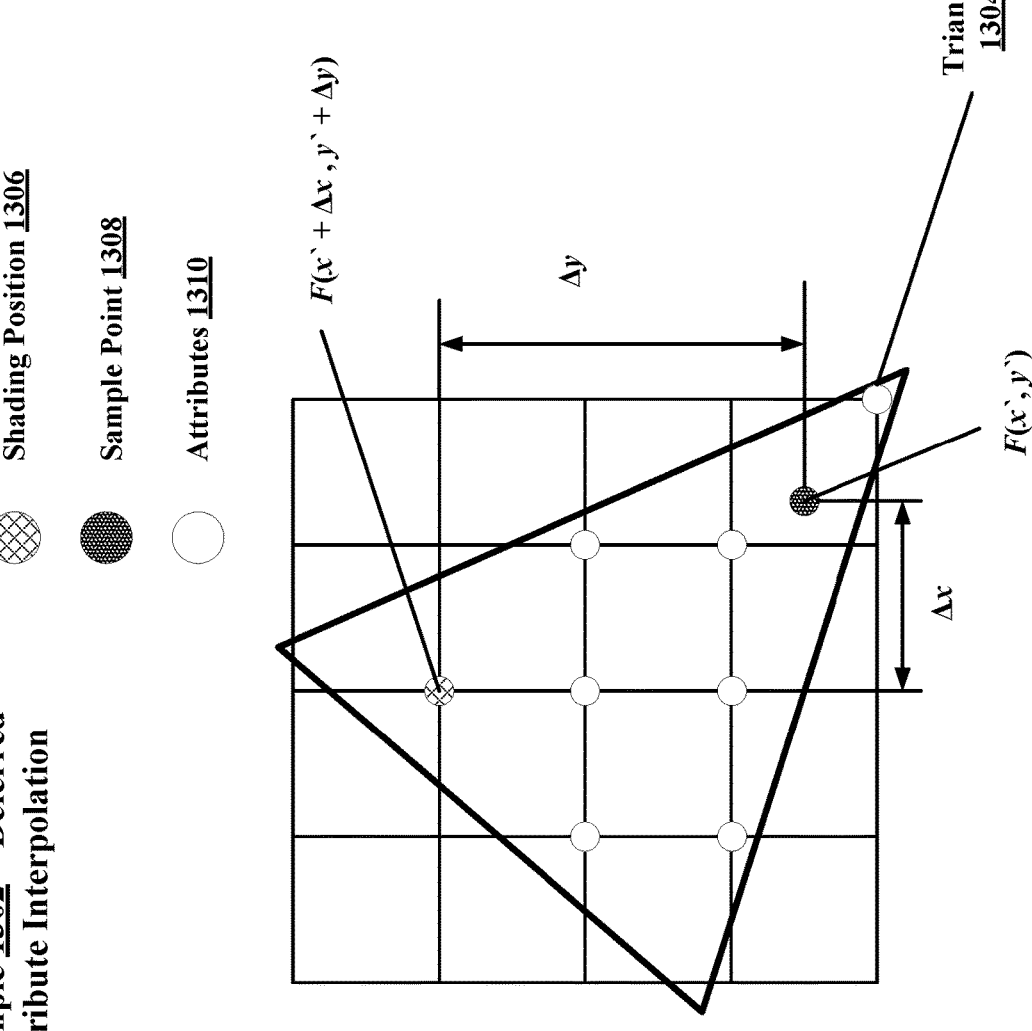
FIG. 13 is a diagram illustrating an example of deferred attribute interpolation in accordance with one or more techniques of this disclosure.

FIG. 13 is a diagram 1300 illustrating an example 1302 of deferred attribute interpolation in accordance with one or more techniques of this disclosure. The example 1302 may correspond to the screen space derivatives stage 1106. Deferred attribute interpolation may be associated with deferred shading. Deferred shading may refer to a screen space shading technique that is performed during a second rendering pass, after shaders and pixel shaders are rendered.

As noted above, during the visibility buffer stage 1104, a device may rasterize a visibility buffer; however, rasterizing the visibility buffer may not generate helper lanes, which will now be described. A pixel shader may operate on 2×2 groups of pixels which may be referred to as a quad. If a triangle covers all 4 pixels in a quad, the device may estimate a partial derivative with respect to x by subtracting left pixel values from right pixel values in the quad and the device may estimate a partial derivative with respect to y by subtracting top pixel values from bottom pixel values in the quad. However, if a triangle does not cover all 4 pixels in the quad, the device may extrapolate the triangle onto a missing pixel. The device may then estimate a partial derivative with respect to x and y using the missing pixel. Pixels in the quad that are covered by a triangle may be referred to as "active lanes" and a pixel (i.e., a missing pixel) in the quad that is running for derivative purposes may be referred to as a "helper lane."

In order to address missing helper lanes caused by rasterization of the visibility buffer, the device may perform deferred attribute interpolation. In deferred attribute interpolation, an attribute (F) of a triangle 1304 may be interpolated at a shading position 1306 by using a sample point 1308 and by adding partial derivatives of attributes 1310 weighted by their distance to the sample point 1308. The device may perform deferred attribute interpolation according to equation (I) below.

$$F(x' + \Delta x, y' + \Delta y) = F(x', y') + \Delta x \frac{\delta F}{\delta x} + \Delta y \frac{\delta F}{\delta y} \qquad \text{(I)}$$

Figure 14:
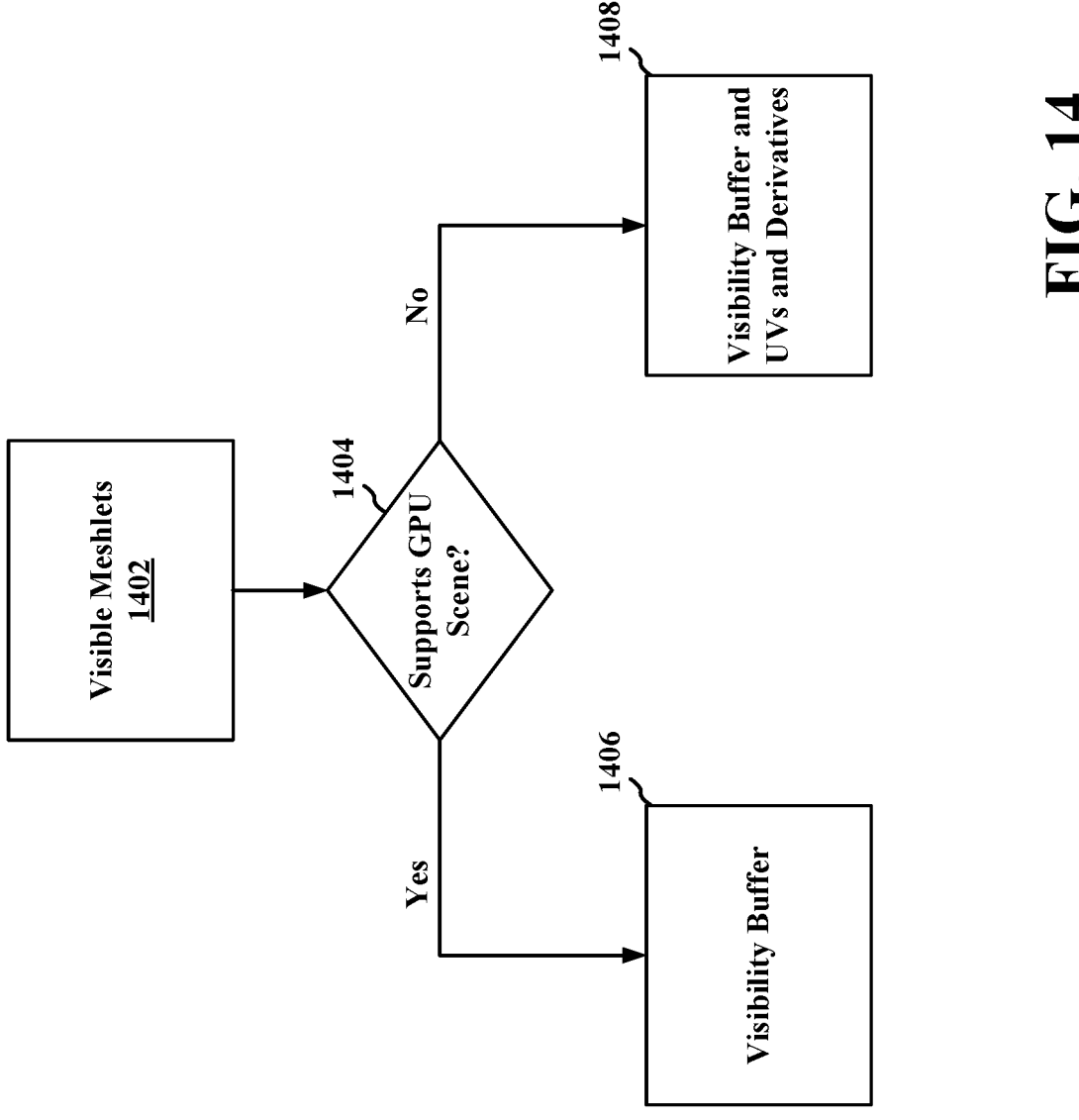
FIG. 14 is a diagram illustrating example aspects of a visibility buffer and a geometry buffer (GBuffer) in accordance with one or more techniques of this disclosure.

FIG. 14 is a diagram 1400 illustrating example aspects of a visibility buffer and a geometry buffer (GBuffer) in accordance with one or more techniques of this disclosure. Deferred attribute interpolation (e.g., the deferred attribute interpolation described in connection with the example 1302) may be performed based on a GPU scene. A GPU scene may refer to vertex data and scene transforms that may be loaded (i.e., the "LoadTriangle" function listed in the pseudocode below) by a shader.

In an example, a device may obtain/determine visible meshlets 1402. At 1404, the device may determine whether a features associated with the visible meshlets 1402 supports a GPU scene. At 1406, if the feature associated with the visible meshlets 1402 supports a GPU scene, the device may not output GBuffer attributes (e.g., UV coordinates and derivatives). At 1408, if the feature associated with the visible meshlets 1402 does not support a GPU scene, the device may output GBuffer attributes (e.g., UV coordinates and derivatives) directly during a visibility pass.

Figure 15:
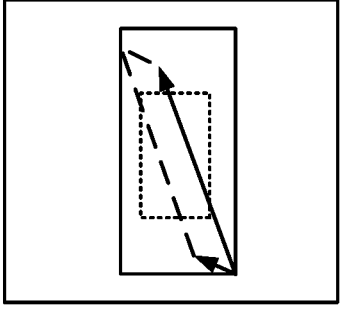
FIG. 15 is a diagram illustrating example aspects of adaptive multi-frequency shading (AMFS) in accordance with one or more techniques of this disclosure.
Figure 15:
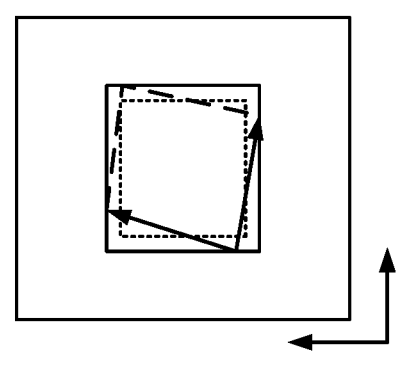

FIG. 15 is a diagram 1500 illustrating example aspects of adaptive multi-frequency shading (AMFS) 1502 in accordance with one or more techniques of this disclosure. During the dicing oracle stage 1108, a device may utilize results from AMFS to determine a resolution of a mip region map (e.g., a resolution of the mip region map 902) based on the inputs: a 2D visibility buffer (e.g., determined in the visibility buffer stage 1104), a list of pre-determined meshlets corresponding to the objects in a 3D scene (e.g., the meshlets 1206), and a target number of pixels in resulting mip regions (i.e., target dimensions of the resulting mip regions in pixels). In an example, the device may target a resolution of 32×32 pixels per mip region. The target size of the mip region may be determined based on resulting GPU work dispatch, spatial coherence in the resulting texture, and/or an accompanying message bit rate. The device may determine an actual shading rate (i.e., "a mip level") during the sampler feedback stage 1112.

In the AMFS 1502, a device may compute an axis-aligned target shading resolution based on bounds of partial derivatives $u_x$ and $u_y$ scaled to a pixel area 1504. A distortion (a) between a screen space and a parametric patch space is provided by equation (II) below.

$$\alpha = \frac{A_{box}}{A_{pixel}} \qquad \text{(II)}$$

In contrast to a Reyes rendering pipeline (e.g., the Reyes rendering pipeline 1002) which may target one micropolygon per pixel on a parametric surface, during the dicing oracle stage 1108, the device may target a number of pixels (e.g., 32×32) per mip region (i.e., per shadel).

Figure 16:
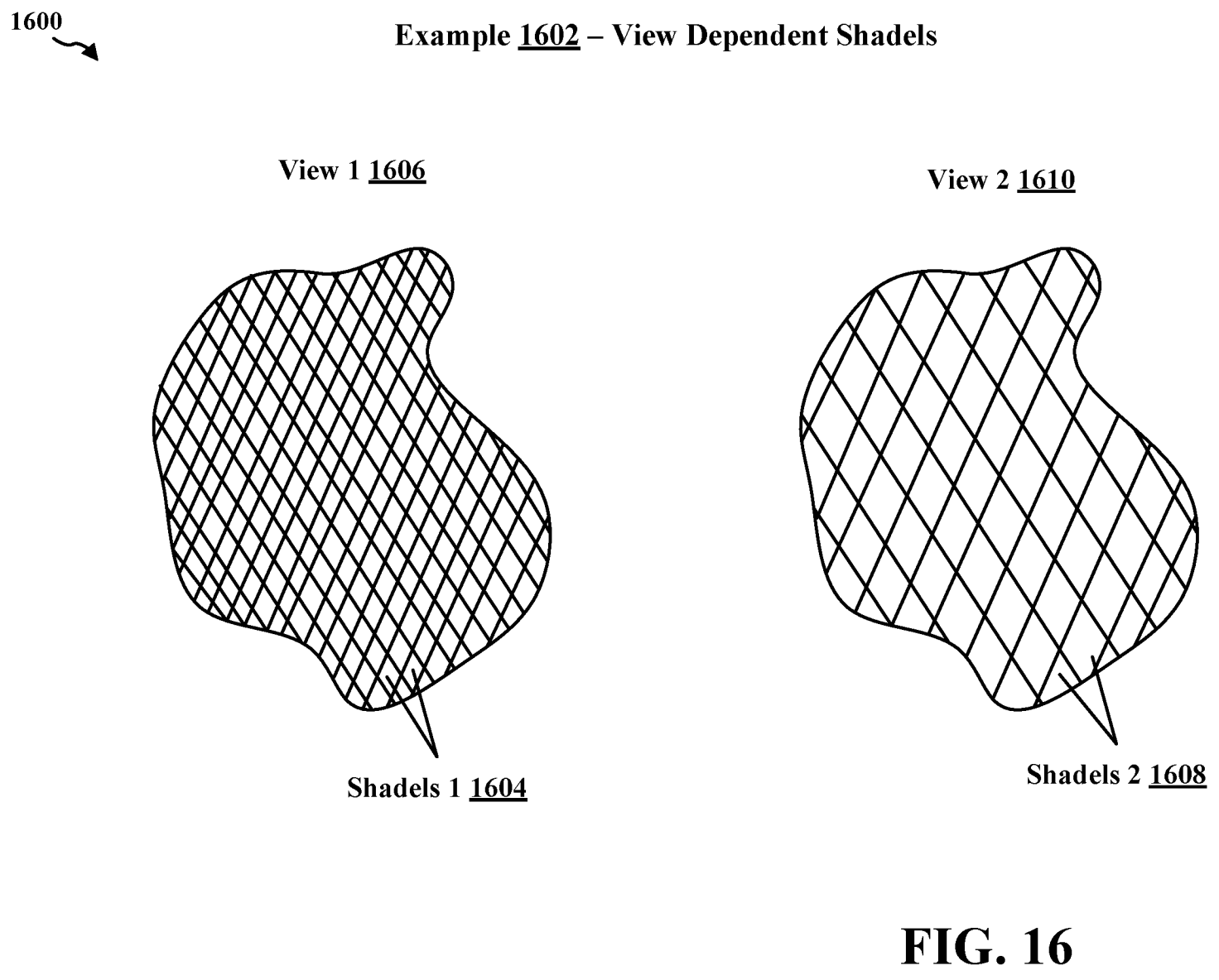

FIG. 16 is a diagram 1600 illustrating an example 1602 of view dependent shadels in accordance with one or more techniques of this disclosure. The example 1602 may correspond to an output of the dicing oracle stage 1108. In one example, during the dicing oracle stage 1108, a device may dice a meshlet (e.g., a meshlet in the meshlets 1206) into first shadels 1604 based on a first view 1606 (i.e., a first view perspective) of the meshlet. A shadel (i.e., a shading element) may refer to a mip region. A view perspective may refer to an angle and a distance at which a meshlet is observed. In an example, the first shadels 1604 may have a first width and a first height that is based on the first view 1606. In another example, during the dicing oracle stage 1108, the device may dice the meshlet into second shadels 1608 based on a second view 1610 (i.e., a second view perspective) of the meshlet. In an example, the second shadels 1608 may have a second width and a second height that is based on the second view 1610, where the second width may differ from the first width and where the second height may differ from the first height. In an example, the first view 1606 may be a relatively close up view of the meshlet and the second view 1610 may be a relatively far away view of the meshlet. In an example, the largest of the first shadels 1604 may appear as size S1 pixels when observed from the first view 1606, and the largest of the second shadels 1608 may appear as size S2 pixels when observed from the second view 1610. In an example, sizes S1 and S2 may be similar and both may be close to the target mip region dimensions.

After the dicing oracle stage 1108, shadels (i.e., shading elements, mip regions) may not have a physical address (e.g., a physical GPU memory address). For instance, after the dicing oracle stage 1108, each shadel may be associated with mip region data (i.e., metadata about a shadel). Each shadel may also be associated with a tile within a shading atlas (e.g., the shading atlas 708). The device may shade a texture within a tile of the shading atlas (e.g., after the material evaluation stage 1114). During the sampler feedback stage 1112, the device may map "virtual" UV coordinates (generated offline by a preprocessor and drawn to a screen each frame) to "resident" (physical) texture coordinates. In one aspect, during the sampler feedback stage 1112, the device may sparsely allocate a mip region map (e.g., the mip region map 902) and corresponding tiles in the shading atlas for visible shadels (and not for invisible shadels). After the sampler feedback stage 1112, materials may be evaluated during the material evaluation stage 1114.

During the dicing oracle stage 1108, meshlets (e.g., a meshlet in the meshlets 1206) may be diced into thousands of shadels (e.g., the first shadels 1604), but in some cases, a small portion of the shadels may be visible and a large portion of the shadels may not be visible. During the shadel allocation stage 1110, memory may be allocated for visible shadels, that is, visible shadels (and not invisible shadels) may be resident in GPU memory. A device may allocate memory for visible shadels in parallel on a GPU. With more particularity, during the shadel allocation stage 1110, the device may group shadels into shadel collections. In an example, there may be a maximum of 128 shadel collections per meshlet and there may be 128 bits of storage per shadel collection (1 bit per shadel). The device may use wave operations to compute offsets into a global buffer that includes "physical" shadel memory. Physical memory (e.g., physical shadel memory) may refer to an actual amount of memory of a device (e.g., a GPU).

Figure 17:
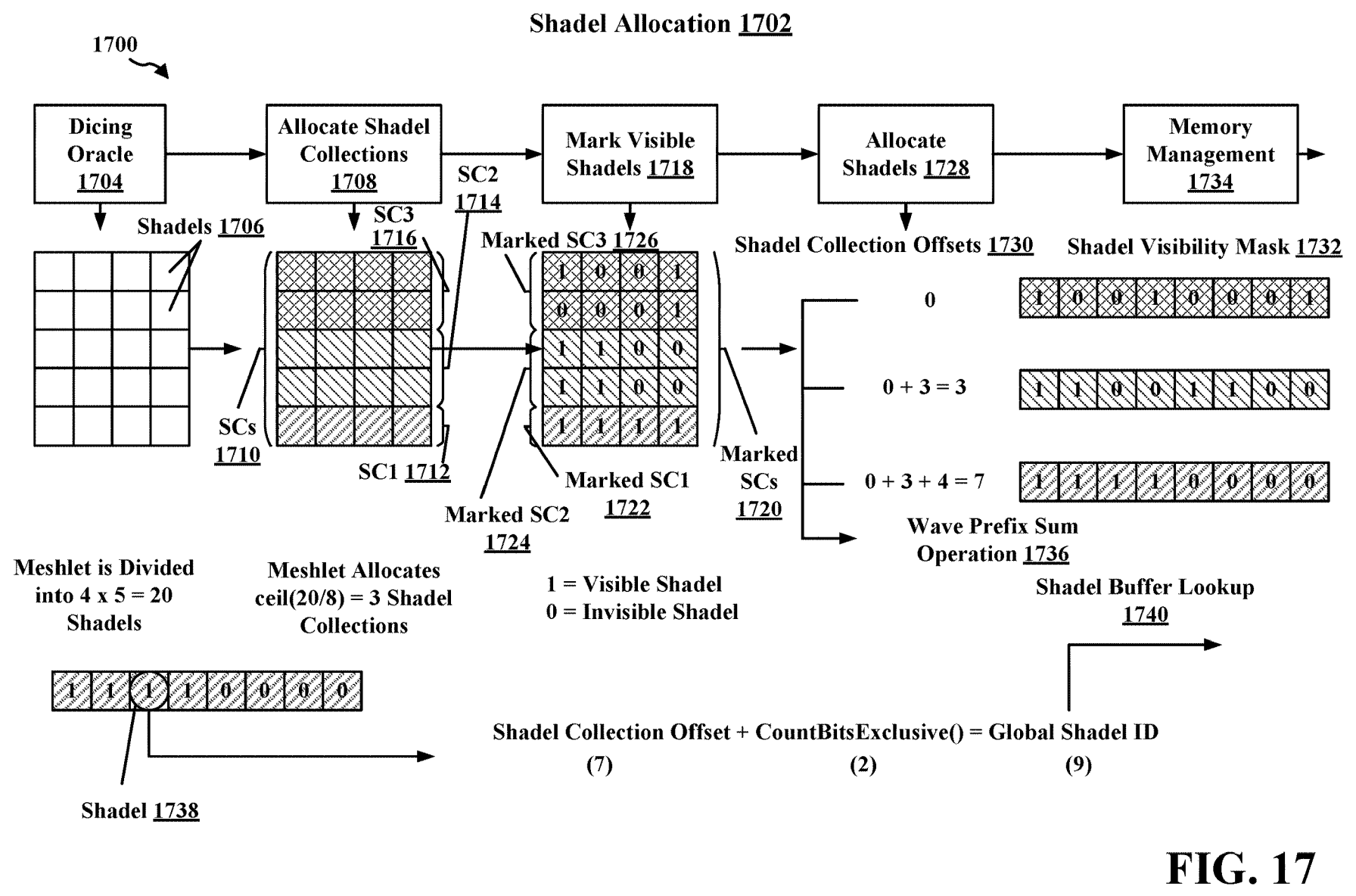

FIG. 17 is a diagram 1700 illustrating example aspects of shadel allocation 1702 in accordance with one or more techniques of this disclosure. As described above in connection with FIGS. 11-16, a device (e.g., the device 104), via a dicing oracle 1704, may generate shadels 1706 (i.e., shading elements, mip regions) based on parametric and screen space coordinates, and a set of derivatives for the set of UV coordinates. The shadels 1706 may also be referred to as shading elements or mip regions. In an example, the dicing oracle 1704 may dice a meshlet (e.g., a meshlet in the meshlets 1206) into 4×5=20 shadels.

At 1708, the device may process the shadels 1706 by assigning them to shadel collections (SCs) 1710 based on a predetermined number of shading elements per SC. A cardinality of shadel collections (i.e., a number of shading elements per SC) may in turn determine a number of SC visibility bits, where each shadel in a shadel collection is associated with one bit out of the number of SC visibility bits. A shadel collection may refer to a group of shading elements. A shadel collection may also be referred to as a shading element group. In an example, 8 bits of storage space may be associated with each SC in the SCs 1710, that is, one SC may keep track of 8 shadels. In the example, the SCs 1710 may include a first SC 1712, a second SC 1714, and a third SC 1716. In the example, the device may allocate the shadels 1706 to the SCs 1710 according to equation (III) below.

$$\text{Number of } SC = \text{ceil}\left(\frac{\text{Number of Shadels}}{\text{Number of Bits Per } SC}\right) \qquad \text{(III)}$$

At 1718, the device may mark visible shadels in the SCs 1710 to generate marked SCs 1720. For instance, for each shadel in the SCs 1710, the device may determine if the shadel will be visible on a screen. A shadel that will be visible on a screen may be referred to as a visible shadel or a visible shading element. In an example, the device may mark visible shadels with a "1" bit and invisible shadels (e.g., backfacing shadels) with a "0" bit. In an example, the marked SCs 1720 may include a first marked SC 1722, a second marked SC 1724, and a third marked SC 1726. In an example, SCs may be processed in a top to bottom order, that is, the third SC 1716 may first be processed to generate the third marked SC 1726, followed by the second SC 1714 to generate the second marked SC 1724, and followed by the first SC 1712 to generate the first marked SC 1722.

At 1728, the device may allocate the marked SCs 1720 by computing shadel collection offsets 1730. A shadel collection offset may refer to a value that keeps track of a number of visible shadels encountered in SCs prior to a current SC. Each of the shadel collection offsets 1730 may be associated with a shadel visibility mask 1732. The shadel visibility mask 1732 and/or the shadel collection offsets 1730 may be utilized for memory management 1734. In one aspect, the device may compute the shadel collection offsets 1730 based on a wave prefix sum operation 1736 (i.e., a wave operation). The wave prefix sum operation 1736 may return a sum of elements (i.e., a sum of visible shadels) for a SC up to, but not including the SC. The wave prefix sum operation 1736 may also be referred to as "wavePrefixSum ( )" In an example, for the third marked SC 1726, the device, via the wave prefix sum operation 1736, may compute a shadel collection offset of "0." For the second marked SC 1724, the device, via the wave prefix sum operation 1736, may compute a shadel collection offset of 0+3=3, where the "3" corresponds to the number of visible shadels in the third marked SC 1726. For the first marked SC 1722, the device, via the wave prefix sum operation 1736, may compute a shadel collection offset of 0+3+4, where the "3" corresponds to the number of visible shadels in the third marked SC 1726 and where the "4" corresponds to the number of visible shadels in the second marked SC 1724.

The device may compute a global shadel ID for each visible shadel out of the shadels 1706 generated by the dicing oracle 1704 based on the shadel collection offsets 1730 and a count bits exclusive operation (which may also be referred to as "CountBitsExclusive ( )." A count bits exclusive operation may count a number of visible shadels in a marked SC (from left to right) up to, but not including a given shadel. A value returned by a count bits exclusive operation may be referred to as an element offset value. In an example, the third SC 1716 may include a shadel 1738 (circled in FIG. 17). As described above, the shadel collection offset for the first SC 1712 may be "7." The count bits exclusive operation may return "2," as there are two visible shadels prior to the shadel 1738 in the first marked SC 1722. The device may sum "7" and "2" to obtain a global shadel ID of "9." The device may perform a shadel buffer lookup 1740 based on the global shadel ID in order to obtain metadata for the shadel 1738. In an example, the metadata for the shadel 1738 may include a mip level that is to be accessed during sampler feedback and a physical address of the shadel 1738 in a shading atlas (e.g., the shading atlas 708). In an example, the metadata may be implemented according to the pseudocode listed below.
struct FShadel

```
{
    // Mip level accessed during sampler feedback
    uint MipLevel;
    // Packed physical texture address in a shading atlas
    uint Address;
};
```

Figure 18:
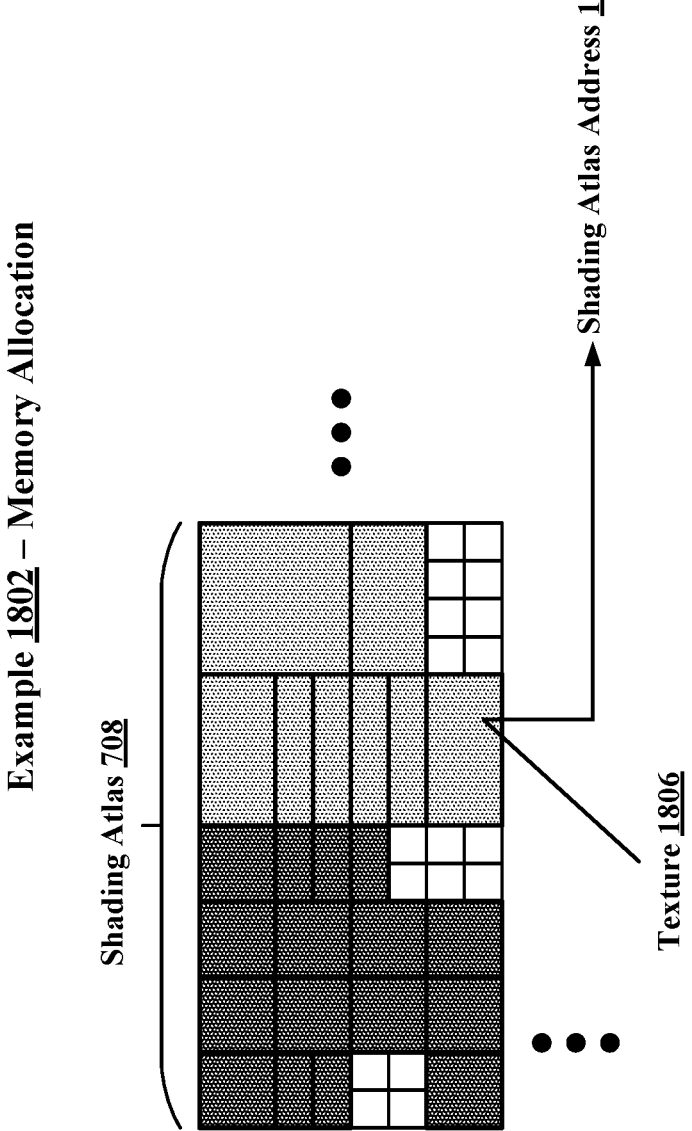
FIG. 18 is a diagram illustrating an example of memory allocation in accordance with one or more techniques of this disclosure.

FIG. 18 is a diagram 1800 illustrating an example 1802 of memory allocation in accordance with one or more techniques of this disclosure. In an example, the shadel allocation 1702 may be a first part of the shadel allocation stage 1110 and the memory allocation in the example 1802 may be a second part of the shadel allocation stage 1110. The example 1802 may correspond to the memory management 1734. In the example 1802, a device may allocate memory of the shading atlas 708 based on a shading atlas address 1804 (i.e., "uint Address") associated with the shading atlas 708. In an example, the shading atlas address 1804 may correspond to a texture 1806 packed into the shading atlas 708, where the texture 1806 may include visible shadels, as in shadels with a global shadel ID as illustrated in FIG. 17. The device may allocate the memory of the shading atlas 708 according to the example 1802 when streaming is to be performed. The device may bump allocate frames when streaming is not to be performed that is, the device may not allocate the memory of the shading atlas 708 according to the example 1802 when streaming is not to be performed. Allocating memory of the shading atlas 708 as per the example 1802 may be associated with a persistent address that increases temporal coherence (as a texture may remain in the same location over multiple frames) when compressing a shading atlas with a video codec, such as High Efficiency Video Coding (H.265). A device may compute a new shading atlas address (e.g., a shading atlas address different from the shading atlas address 1804) when a mip level of a shadel changes or when dicing of a shadel changes.

After the shadel allocation stage 1110, a device may be able to index (e.g., via a global shadel ID) into a shadel buffer to retrieve metadata for a shadel (e.g., FShadel). Furthermore, after the shadel allocation stage 1110, a physical address/tile in a shading atlas (FShadel::Address) may be used to translate virtual UV coordinates into physical texture coordinates. The metadata and the physical address/tile may enable the sampler feedback stage 1112. During sampler feedback (i.e., during the sampler feedback stage 1112), a device may mark which texels at which mip levels in texture space, that for a frame, will be sampled from a screen space in order to inform a shading system as to which texels are to be shaded in the frame.

Figure 19:
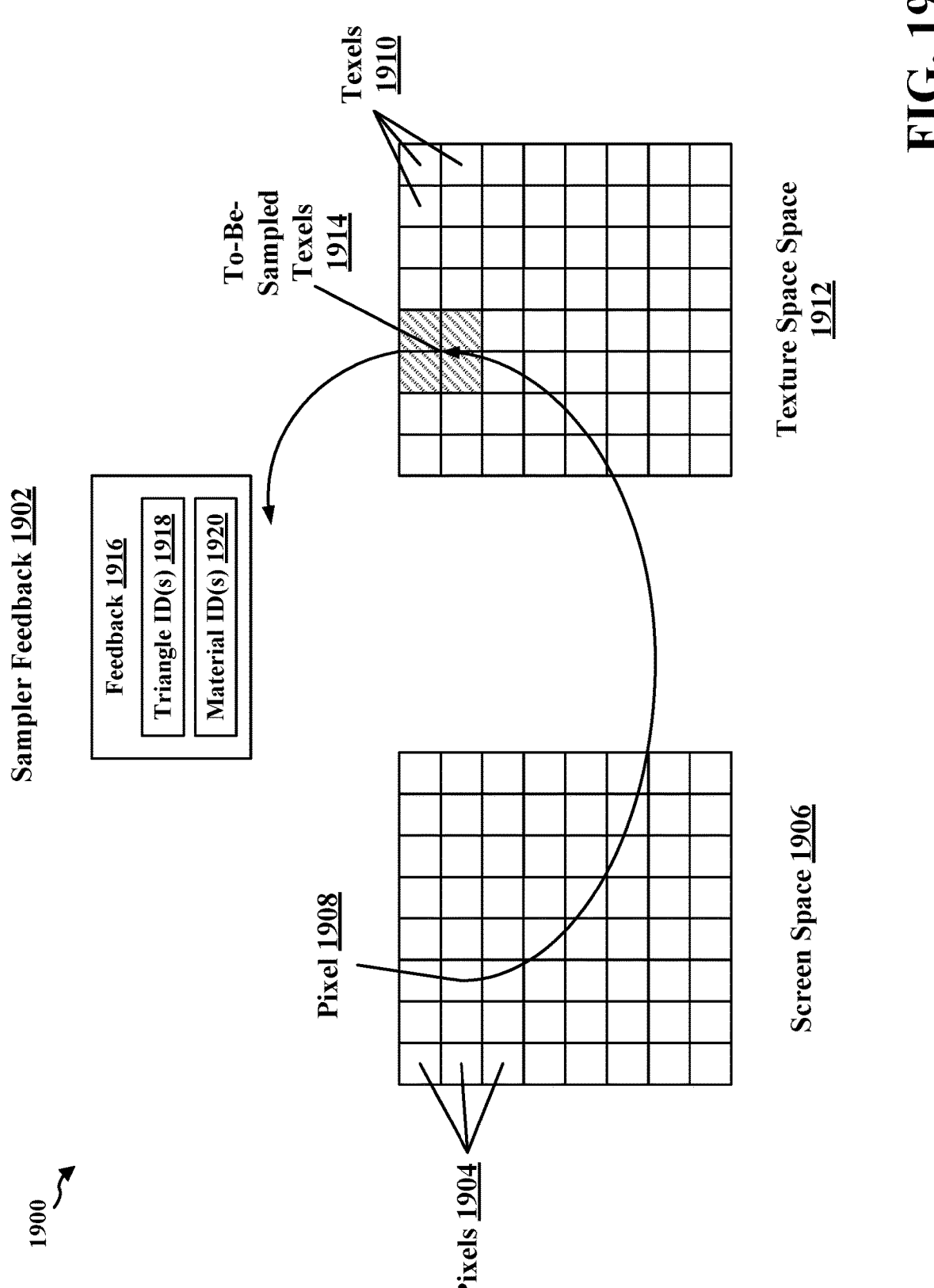
FIG. 19 is a diagram illustrating example aspects of sampler feedback in accordance with one or more techniques of this disclosure.

FIG. 19 is a diagram 1900 illustrating example aspects of sampler feedback 1902 in accordance with one or more techniques of this disclosure. The sampler feedback 1902 may correspond to the sampler feedback stage 1112. During the sampler feedback 1902, for each pixel in screen space, a device may gather corresponding texels that would be sampled in texture space. The device may feedback a triangle ID (at a pixel) and a material ID (at the pixel) at a filter footprint (e.g., a bilinear filter footprint). The device may also rasterize a meshlet in texture space at every location of the meshlet's shadels to indicate a mapping from a texel to triangle and material ID. Some of the shadels may not utilize a lowest mip level (e.g., 32×32) targeted during the Dicing Oracle stage, and the device may choose to assign to such shadels a mip level that is less detailed during the sampler feedback 1902.

During the sampler feedback 1902, the device may have access to pixels 1904 in a screen space 1906, where the pixels 1904 may include a pixel 1908. The device may have access to texels 1910 in a texture space 1912. For the pixel 1908, the device may gather texels (to-be-sampled texels 1914). The device may feedback 1916 triangle ID(s) 1918 and material ID(s) 1920 for the to-be-sampled texels 1914. In an example, the feedback 1916 may be provided to a shader of the device. The device may shade textures (e.g., packed textures in a shading atlas) based on the feedback 1916.

Figure 20:
FIG. 20 is a diagram illustrating example aspects of variable rate shading (VRS) in accordance with one or more techniques of this disclosure.
Figure 20:
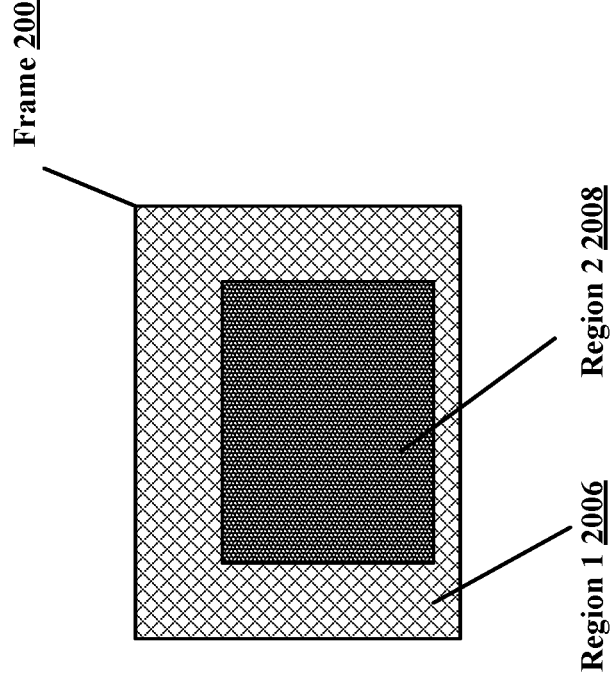
Figure 20:

FIG. 20 is a diagram 2000 illustrating example aspects of variable rate shading (VRS) 2002 in accordance with one or more techniques of this disclosure. VRS 2002 may refer to varying a shading rate for different regions of a frame 2004. A shading rate may refer to a resolution at which a shader is executed. In an example, the frame 2004 may include a first region 2006 and a second region 2008. In accordance with VRS, a device (e.g., the device 104) may shade the first region 2006 at a first shading rate 2010 and the device may shade the second region 2008 at the second shading rate 2012, where the first shading rate 2010 and the second shading rate 2012 may differ. The device may support VRS 2002 by biasing a mip level of a shadel (e.g., a shadel generated during the dicing oracle stage 1108 and allocated during the shadel allocation stage 1110). In an example, one shading result may be utilized to color one pixel in the second region 2008 and one shading result may be used to color four pixels (e.g., 2×2 pixels) in the first region 2006. In an example, VRS 2002 may be associated with foveation, whereby the first region 2006 may correspond to the region outside a fovea, and the second region 2008 may correspond to the region inside the fovea. In an example, a location, a size, and a shape of the first region and the second region may be changed dynamically as a result of eye tracking performed on the wearable display device 606.

Figure 21:
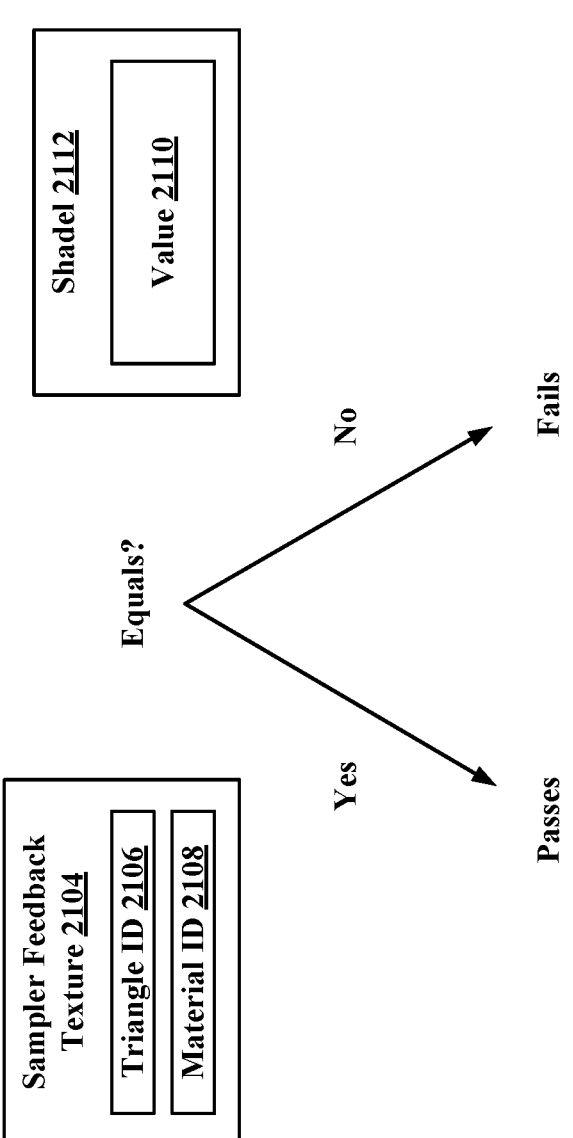
FIG. 21 is a diagram illustrating example aspects of depth equals testing in accordance with one or more techniques of this disclosure.

FIG. 21 is a diagram 2100 illustrating example aspects of depth equals testing 2102 in accordance with one or more techniques of this disclosure. The depths equals testing 2102 may correspond to the material evaluation stage 1114. In the material evaluation stage 1114, the device may have access to a sampler feedback texture 2104 populated in the sampler feedback stage 1112. The sampler feedback texture 2104 may be a map that includes triangle ID(s) 2106 and material ID(s) 2108. The sampler feedback texture 2104 may correspond to the feedback 1916. The device may utilize depth testing hardware of a GPU to quickly skip parts of the shading atlas that do not contain a matching material ID.

In the depth equals testing 2102, the device may treat the triangle ID(s) 2106 (i.e., a primitive identifier) and material ID(s) 2108 as a depth value. A material ID may be one of the attributes associated with a geometry unit, together with vertex colors, normals, etc. The device may utilize the depth equals testing 2102 to compare material ID values (e.g., the material ID(s) 2108) obtained from a sampler feedback texture 2104 to (corresponding) values (e.g., values such as a value 2110) recorded in a shadel 2112. If the material ID(s) 2108 does not match the value 2110 (i.e., "fail"), a corresponding texel may be discarded. If the material ID(s) 2108 match the value 2110 (i.e., "pass"), the corresponding texels may be shaded in the shading atlas. In one aspect, the depth equals testing 2102 may be associated with early z-culling.

After or during the material evaluation stage 1114 (and prior to the streaming stage 1116), the device may utilize deferred attribute interpolation (e.g., as described above in the example 1302) to shade a texture. In an example, the device may "draw" a material over a sampler feedback texture (e.g., the sampler feedback texture 2104). For each texel associated with each shadel that passes the depths equals testing 2102 (i.e., for each texel that passes early z-culling), the device may load the triangle ID(s) 2106 and the material ID(s) 2108 from the sampler feedback texture 2104 corresponding to the texel, load triangle vertex attributes, apply barycentric interpolation, and provide interpolated attributes to shading code. For instance, loading the triangle ID(s) 2106 and the material ID(s) 2108 from the sampler feedback texture 2104, loading the triangle vertex attributes, applying the barycentric interpolation, and providing the interpolated attributes to the shading code may be implemented via the pseudocode listed below.

Color4 MainPS (in int2 TexelPos):

MeshletID, TriangleID=SamplerFeedback.Load (Texel-Pos)

VertexAttributes [3]=LoadTriangle (MeshletID, TriangleID)

InterpolatedAttributes=BarycentricInterpolation (Vertex-Attributes, TexelPos)

return UnrealShading (InterpolatedAttributes).

Figure 22:
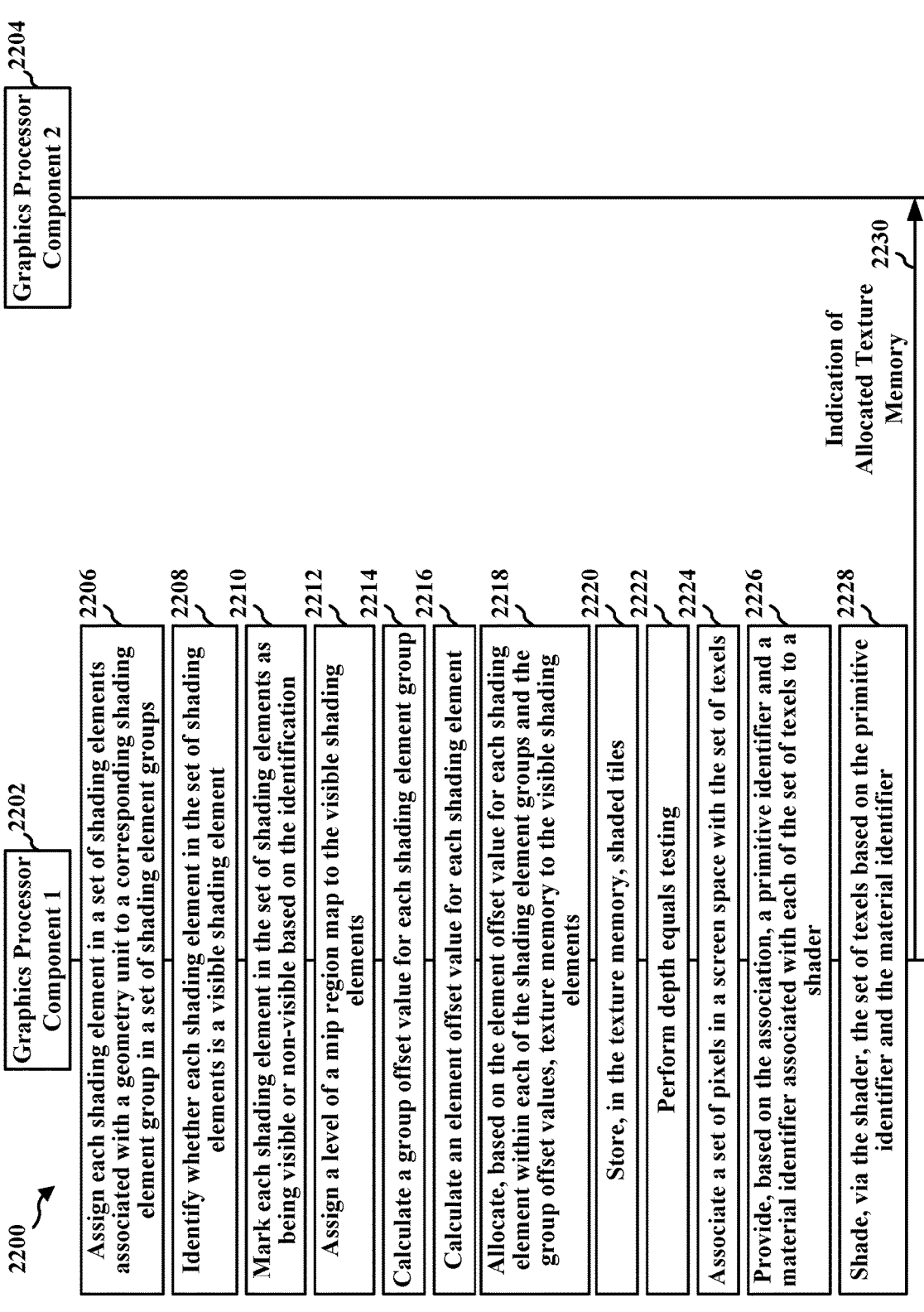
FIG. 22 is a call flow diagram illustrating example communications between a first graphics processor component and a second graphics processor component in accordance with one or more techniques of this disclosure.

FIG. 22 is a call flow diagram 2200 illustrating example communications between a first graphics processor component 2202 and a second graphics processor component 2204 in accordance with one or more techniques of this disclosure. The first graphics processor component 2202 and the second graphics processor component 2204 may be included in the device 104. In another example, the first graphics processor component 2202 and the second graphics processor component 2204 may be included in the remote device 604 or in the wearable display device 606. The first graphics processor component 2202 and the second graphics processor component 2204 may be associated with the graphics pipeline 1102.

At 2206, the first graphics processor component 2202 may assign each shading element in a set of shading elements associated with a geometry unit to a corresponding shading element group in a set of shading element groups. At 2208, the first graphics processor component 2202 may identify whether each shading element in the set of shading elements is a visible shading element. At 2214, the first graphics processor component 2202 may calculate a group offset value for each shading element group in the set of shading element groups based on a number of visible shading elements in the set of shading elements. At 2216, the first graphics processor component 2202 may calculate an element offset value for each shading element within each of the shading element groups based on a number of visible shading elements in the shading element group. At 2218, the first graphics processor component 2202 may allocate, based on the element offset value for each shading element within each of the shading element groups and the group offset value for each shading element group in the set of shading element groups, texture memory to the visible shading elements in each of the shading element groups. At 2230, the first graphics processor component 2202 may output (e.g., to the second graphics processor component 2204) an indication of the allocated texture memory to the visible shading elements in each of the shading element groups.

At 2210, the first graphics processor component 2202 may mark each shading element in the set of shading elements as being visible or non-visible based on the identification, where calculating the group offset value at 2214 may include calculating the group offset value based on whether a shading element is marked, and where calculating the element offset value at 2216 may include calculating the element offset value based on whether the shading element is marked. At 2212, the first graphics processor component 2202 may assign a level of a mip region map to the visible shading elements in each of the shading element groups, where allocating the texture memory at 2218 may be further based on the assigned level. At 2220, the first graphics processor component 2202 may store, in the texture memory, shaded tiles based on the visible shading elements in each of the shading element groups.

At 2224, the first graphics processor component 2202 may associate a set of pixels in a screen space with the set of texels. At 2226, the first graphics processor component 2202 may provide, based on the association, the primitive identifier and the material identifier associated with each of the set of texels to a shader. At 2228, the first graphics processor component 2202 may shade, via the shader, the set of texels based on the primitive identifier and the material identifier associated with each of the set of texels, wherein the set of texels is associated with the shaded tiles. At 2222, the first graphics processor component 2202 may perform depth equals testing based on the primitive identifier and the material identifier associated with each of the set of texels and the visible shading elements, where shading the set of texels at 2228 may include shading the set of texels further based on each of the set of texels passing the depth equals testing.

Figure 23:
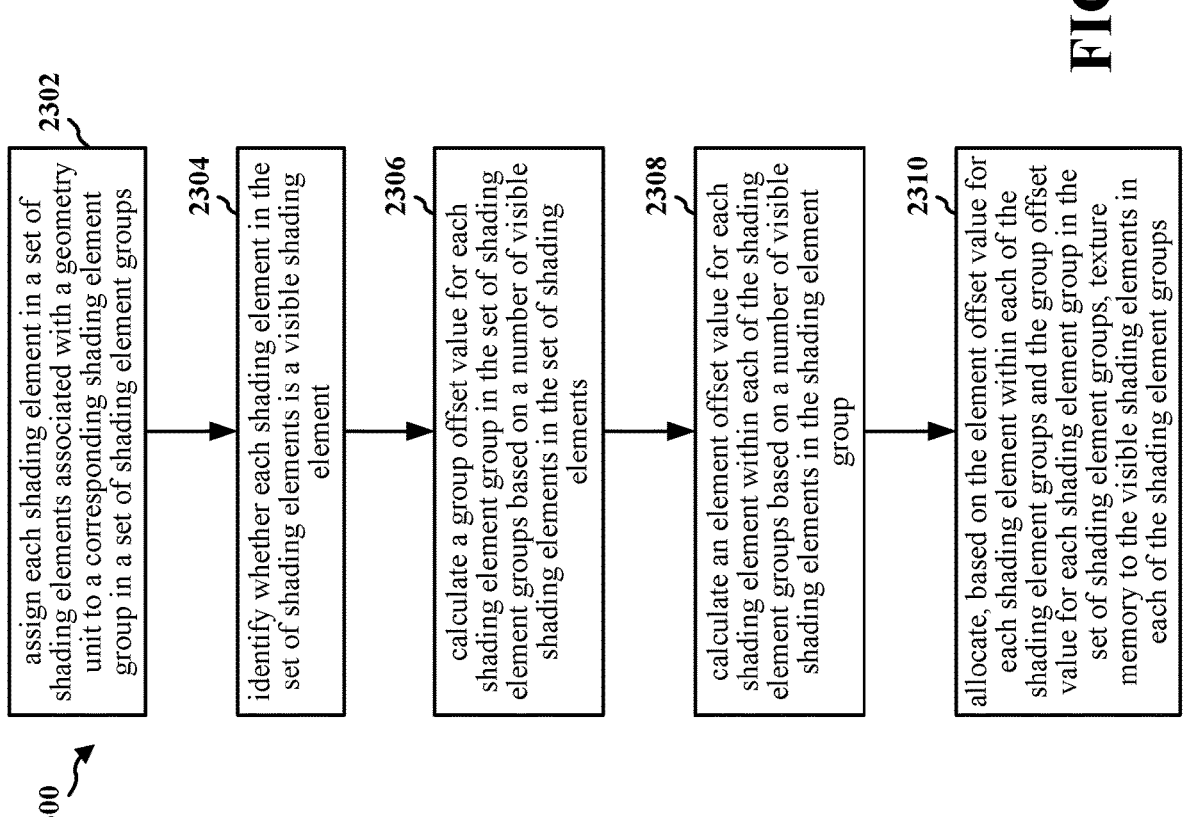
FIG. 23 is a flowchart of an example method of graphics processing in accordance with one or more techniques of this disclosure.

FIG. 23 is a flowchart 2300 of an example method of graphics processing in accordance with one or more techniques of this disclosure. The method may be performed by an apparatus, such as an apparatus for graphics processing, a GPU, a CPU, the device 104, a wireless communication device, and the like, as used in connection with the aspects of FIGS. 1-22. The method may be associated with various advantages at the apparatus, such as facilitating compatibility of TSS with texture tiling and/or procedural texture generation. Furthermore, the method may reduce an amount of texture memory used for TSS. In an example, the method may be performed by the feedback sampler 198.

At 2302, the apparatus (e.g., a graphics processor) assigns each shading element in a set of shading elements associated with a geometry unit to a corresponding shading element group in a set of shading element groups. For example, FIG. 22 at 2206 shows that the first graphics processor component 2202 may assign each shading element in a set of shading elements associated with a geometry unit to a corresponding shading element group in a set of shading element groups. In an example, the set of shading elements may include the first shadels 1604 or the second shadels 1608. In an example, the set of shading elements may be an output of the dicing oracle stage 1108. In an example, assigning each shading element in a set of shading elements associated with a geometry unit to a corresponding shading element group in a set of shading element groups may correspond to the shadel allocation stage 1110. In an example, the corresponding shading element group may be the first SC 1712, the second SC 1714, or the third SC 1716. In an example, the set of shading element groups may be or include the SCs 1710. In an example, assigning each shading element in a set of shading elements associated with a geometry unit to a corresponding shading element group in a set of shading element groups may correspond to 1708 in FIG. 17. In an example, the geometry unit may be a meshlet. In an example, 2302 may be performed by the feedback sampler 198.

At 2304, the apparatus (e.g., a graphics processor) identifies whether each shading element in the set of shading elements is a visible shading element. For example, FIG. 22 at 2208 shows that the first graphics processor component 2202 may identify whether each shading element in the set of shading elements is a visible shading element. In an example, identifying whether each shading element in the set of shading elements is a visible shading element may correspond to 1718 in FIG. 17. In an example, identifying whether each shading element in the set of shading elements is a visible shading element may correspond to the shadel allocation stage 1110. In an example, 2304 may be performed by the feedback sampler 198.

At 2306, the apparatus (e.g., a graphics processor) calculates a group offset value for each shading element group in the set of shading element groups based on a number of visible shading elements in the set of shading elements. For example, FIG. 22 at 2214 shows that the first graphics processor component 2202 may calculate a group offset value for each shading element group in the set of shading element groups based on a number of visible shading elements in the set of shading elements. In an example, the group offset value may be or include a shadel collection offset in the shadel collection offsets 1730. In an example, calculating the group offset value for each shading element group in the set of shading element groups based on a number of visible shading elements in the set of shading elements may correspond to the shadel allocation stage 1110. In an example, 2306 may be performed by the feedback sampler 198.

At 2308, the apparatus (e.g., a graphics processor) calculates an element offset value for each shading element within each of the shading element groups based on a number of visible shading elements in the shading element group. For example, FIG. 22 at 2216 shows that the first graphics processor component 2202 may calculate an element offset value for each shading element within each of the shading element groups based on a number of visible shading elements in the shading element group. In an example, the element offset value may correspond to the "CountBitsExclusive ( )" operation in FIG. 17. In an example, calculating an element offset value for each shading element within each of the shading element groups based on a number of visible shading elements in the shading element group may correspond to the shadel allocation stage 1110. In an example, 2308 may be performed by the feedback sampler 198.

At 2310, the apparatus (e.g., a graphics processor) allocates, based on the element offset value for each shading element within each of the shading element groups and the group offset value for each shading element group in the set of shading element groups, texture memory to the visible shading elements in each of the shading element groups. For example, FIG. 22 at 2218 shows that the first graphics processor component 2202 may allocate, based on the element offset value for each shading element within each of the shading element groups and the group offset value for each shading element group in the set of shading element groups, texture memory to the visible shading elements in each of the shading element groups. In an example, allocating the texture memory may correspond to the memory management 1734 in FIG. 17. In an example, allocating the texture memory may correspond to the shadel allocation stage 1110. In an example, allocating the texture memory may correspond to the example 1802. In an example, 2310 may be performed by the feedback sampler 198.

FIG. 24 is a flowchart 2400 of an example method of graphics processing in accordance with one or more techniques of this disclosure. The method may be performed by an apparatus, such as an apparatus for graphics processing, a GPU, a CPU, the device 104, a wireless communication device, and the like, as used in connection with the aspects of FIGS. 1-22. The method may be associated with various advantages at the apparatus, such as facilitating compatibility of TSS with texture tiling and/or procedural texture generation. Furthermore, the method may reduce an amount of texture memory used for TSS. In an example, the method (including the various aspects detailed below) may be performed by the feedback sampler 198.

At 2402, the apparatus (e.g., a graphics processor) assigns each shading element in a set of shading elements associated with a geometry unit to a corresponding shading element group in a set of shading element groups. For example, FIG. 22 at 2206 shows that the first graphics processor component 2202 may assign each shading element in a set of shading elements associated with a geometry unit to a corresponding shading element group in a set of shading element groups. In an example, the set of shading elements may include the first shadels 1604 or the second shadels 1608. In an example, the set of shading elements may be an output of the dicing oracle stage 1108. In an example, assigning each shading element in a set of shading elements associated with a geometry unit to a corresponding shading element group in a set of shading element groups may correspond to the shadel allocation stage 1110. In an example, the corresponding shading element group may be the first SC 1712, the second SC 1714, or the third SC 1716. In an example, the set of shading element groups may be or include the SCs 1710. In an example, assigning each shading element in a set of shading elements associated with a geometry unit to a corresponding shading element group in a set of shading element groups may correspond to 1708 in FIG. 17. In an example, the geometry unit may be a meshlet. In an example, 2402 may be performed by the feedback sampler 198.

At 2404, the apparatus (e.g., a graphics processor) identifies whether each shading element in the set of shading elements is a visible shading element. For example, FIG. 22 at 2208 shows that the first graphics processor component 2202 may identify whether each shading element in the set of shading elements is a visible shading element. In an example, identifying whether each shading element in the set of shading elements is a visible shading element may correspond to 1718 in FIG. 17. In an example, identifying whether each shading element in the set of shading elements is a visible shading element may correspond to the shadel allocation stage 1110. In an example, 2404 may be performed by the feedback sampler 198.

At 2410, the apparatus (e.g., a graphics processor) calculates a group offset value for each shading element group in the set of shading element groups based on a number of visible shading elements in the set of shading elements. For example, FIG. 22 at 2214 shows that the first graphics processor component 2202 may calculate a group offset value for each shading element group in the set of shading element groups based on a number of visible shading elements in the set of shading elements. In an example, the group offset value may be or include a shadel collection offset in the shadel collection offsets 1730. In an example calculating the group offset value may correspond to the shadel allocation stage 1110. In an example, 2410 may be performed by the feedback sampler 198.

At 2412, the apparatus (e.g., a graphics processor) calculates an element offset value for each shading element within each of the shading element groups based on a number of visible shading elements in the shading element group. For example, FIG. 22 at 2216 shows that the first graphics processor component 2202 may calculate an element offset value for each shading element within each of the shading element groups based on a number of visible shading elements in the shading element group. In an example, the element offset value may correspond to the "CountBitsExclusive ( )" operation in FIG. 17. In an example, calculating the element offset value may correspond to the shadel allocation stage 1110. In an example, 2412 may be performed by the feedback sampler 198.

At 2414, the apparatus (e.g., a graphics processor) allocates, based on the element offset value for each shading element within each of the shading element groups and the group offset value for each shading element group in the set of shading element groups, texture memory to the visible shading elements in each of the shading element groups. For example, FIG. 22 at 2218 shows that the first graphics processor component 2202 may allocate, based on the element offset value for each shading element within each of the shading element groups and the group offset value for each shading element group in the set of shading element groups, texture memory to the visible shading elements in each of the shading element groups. In an example, allocating the texture memory may correspond to the memory management 1734 in FIG. 17. In an example, allocating the texture memory may correspond to the shadel allocation stage 1110. In an example, allocating the texture memory may correspond to the example 1802. In an example, 2414 may be performed by the feedback sampler 198.

In one aspect, at 2418, the apparatus (e.g., a graphics processor) may output an indication of the allocated texture memory to the visible shading elements in each of the shading element groups. For example, FIG. 22 at 2230 shows that the first graphics processor component 2202 may output (e.g., to the second graphics processor component 2204) an indication of the allocated texture memory to the visible shading elements in each of the shading element groups. In an example, 2418 may be performed by the feedback sampler 198.

In one aspect, outputting the indication of the allocated texture memory may include: transmitting the indication of the allocated texture memory; or storing the indication of the allocated texture memory. For example, outputting the indication of the allocated texture memory at 2418 may include: transmitting the indication of the allocated texture memory (e.g., to the second graphics processor component 2204); or storing the indication of the allocated texture memory.

In one aspect, the geometry unit may include at least one of a meshlet or a triangle. For example, the geometry unit may include the meshlets 1206 or a triangle.

In one aspect, at 2406, the apparatus (e.g., a graphics processor) may mark each shading element in the set of shading elements as being visible or non-visible based on the identification, where calculating the group offset value may include calculating the group offset value based on whether a shading element is marked, and where calculating the element offset value may include calculating the element offset value based on whether the shading element is marked. For example, FIG. 22 at 2210 shows that the first graphics processor component 2202 may mark each shading element in the set of shading elements as being visible or non-visible based on the identification, where calculating the group offset value at 2214 may include calculating the group offset value based on whether a shading element is marked, and where calculating the element offset value at 2216 may include calculating the element offset value based on whether the shading element is marked. In an example, marking each shading element in the set of shading elements as being visible or non-visible may correspond to 1718 in FIG. 17. In an example, marking each shading element in the set of shading elements as being visible or non-visible may correspond to the shadel allocation stage 1110. In an example, 2406 may be performed by the feedback sampler 198.

In one aspect, assigning each shading element to the corresponding shading element group may include assigning one bit out of a number of SC visibility bits to each shading element in the corresponding shading element group. In an example, the number of SC visibility bits may be the "Number of Bits Per SC" in equation (III) above.

In one aspect, calculating the group offset value for each shading element group in the set of shading element groups based on the number of visible shading elements in the set of shading elements may include performing a wave operation on the set of shading element groups. For example, calculating the group offset value at 2214 may include performing a wave operation on the set of shading element groups. In an example, the wave operation may be or include the wave prefix sum operation 1736.

In one aspect, at 2408, the apparatus (e.g., a graphics processor) may assign a level of a mip region map to the visible shading elements in each of the shading element groups, where allocating the texture memory may be further based on the assigned level. For example, FIG. 22 at 2212 shows that the first graphics processor component 2202 may assign a level of a mip region map to the visible shading elements in each of the shading element groups, where allocating the texture memory may be further based on the assigned level. In an example, the mip region map may be or include the mip region map 902. In an example, 2408 may be performed by the feedback sampler 198.

In one aspect, the texture memory may include physical memory of a graphics processor. For example, the texture memory may be associated with the shading atlas 708.

In one aspect, at 2416, the apparatus (e.g., a graphics processor) may store, in the texture memory, shaded tiles based on the visible shading elements in each of the shading element groups. For example, FIG. 22 at 2220 shows that the first graphics processor component 2202 may store, in the texture memory, shaded tiles based on the visible shading elements in each of the shading element groups. In an example, the aforementioned aspect may correspond to the sampler feedback stage 1112. In an example, 2416 may be performed by the feedback sampler 198.

In one aspect, the visible shading elements may be associated with a set of texels, where each of the set of texels may be associated with a primitive identifier and a material identifier, and at 2422, the apparatus may associate a set of pixels in a screen space with the set of texels. For example, FIG. 22 at 2224 shows that the first graphics processor component 2202 may associate a set of pixels in a screen space with the set of texels. In an example, the set of pixels may be or include the pixels 1904 and the set of texels may be or include texels 1910 or the to-be-sampled texels 1914. In an example, the primitive identifier may be the triangle ID(s) 1918 and the material identifier may be the material ID(s) 1920. In an example, the screen space may be the screen space 1906. In an example, the aforementioned aspect may correspond to the sampler feedback stage 1112. In an example, 2422 may be performed by the feedback sampler 198.

In one aspect, at 2424, the apparatus (e.g., a graphics processor) may provide, based on the association, the primitive identifier and the material identifier associated with each of the set of texels to a shader. For example, FIG. 22 at 2226 shows that the first graphics processor component 2202 may provide, based on the association, the primitive identifier and the material identifier associated with each of the set of texels to a shader. In an example, the aforementioned aspect may correspond to the sampler feedback stage 1112. In an example, the aforementioned aspect may correspond to the feedback 1916. In an example, 2424 may be performed by the feedback sampler 198.

In one aspect, at 2426, the apparatus (e.g., a graphics processor) may shade, via the shader, the set of texels based on the primitive identifier and the material identifier associated with each of the set of texels, wherein the set of texels is associated with the shaded tiles. For example, FIG. 22 at 2228 shows that the first graphics processor component may shade, via the shader, the set of texels based on the primitive identifier and the material identifier associated with each of the set of texels, where the set of texels is associated with the shaded tiles. In an example, 2426 may be performed by the feedback sampler 198.

In one aspect, at 2420, the apparatus (e.g., a graphics processor) may perform depth equals testing based on the primitive identifier and the material identifier associated with each of the set of texels and the visible shading elements, where shading the set of texels may include shading the set of texels further based on each of the set of texels passing the depth equals testing. For example, FIG. 22 at 2222 shows that the first graphics processor component 2202 may perform depth equals testing based on the primitive identifier and the material identifier associated with each of the set of texels and the visible shading elements, where shading the set of texels at 2228 may include shading the set of texels further based on each of the set of texels passing the depth equals testing. In an example, the aforementioned aspect may correspond to the material evaluation stage 1114. In an example, the aforementioned aspect may correspond to the depth equals testing 2102. In an example, 2420 may be performed by the feedback sampler 198.

In one aspect, the texture memory may be associated with an addressed within a shading atlas. In an example, the shading atlas may be or include the shading atlas 708. In an example, the aforementioned aspect may correspond to the shading atlas address 1804.

In configurations, a method or an apparatus for graphics processing is provided. The apparatus may be a GPU, a CPU, or some other processor that may perform graphics processing. In aspects, the apparatus may be the processing unit 120 within the device 104, or may be some other hardware within the device 104 or another device. The apparatus may include means for assigning each shading element in a set of shading elements associated with a geometry unit to a corresponding shading element group in a set of shading element groups. The apparatus may further include means for identifying whether each shading element in the set of shading elements is a visible shading element. The apparatus may further include means for calculating a group offset value for each shading element group in the set of shading element groups based on a number of visible shading elements in the set of shading elements. The apparatus may further include means for calculating an element offset value for each shading element within each of the shading element groups based on a number of visible shading elements in the shading element group. The apparatus may further include means for allocating, based on the element offset value for each shading element within each of the shading element groups and the group offset value for each shading element group in the set of shading element groups, texture memory to the visible shading elements in each of the shading element groups. The apparatus may further include means for outputting an indication of the allocated texture memory to the visible shading elements in each of the shading element groups. The apparatus may further include means for marking each shading element in the set of shading elements as being visible or non-visible based on the identification, where calculating the group offset value includes calculating the group offset value based on whether a shading element is marked, and where calculating the element offset value includes calculating the element offset value based on whether the shading element is marked. The apparatus may further include means for assigning a level of a mip region map to the visible shading elements in each of the shading element groups, where allocating the texture memory is further based on the assigned level. The apparatus may further include means for storing, in the texture memory, shaded tiles based on the visible shading elements in each of the shading element groups. The apparatus may further include means for associating a set of pixels in a screen space with the set of texels. The apparatus may further include means for providing, based on the association, the primitive identifier and the material identifier associated with each of the set of texels to a shader. The apparatus may further include means for shading, via the shader, the set of texels based on the primitive identifier and the material identifier associated with each of the set of texels, wherein the set of texels is associated with the shaded tiles. The apparatus may further include means for performing depth equals testing based on the primitive identifier and the material identifier associated with each of the set of texels and the visible shading elements, where shading the set of texels includes shading the set of texels further based on each of the set of texels passing the depth equals testing.

It is understood that the specific order or hierarchy of blocks/steps in the processes, flowcharts, and/or call flow diagrams disclosed herein is an illustration of example approaches. Based upon design preferences, it is understood that the specific order or hierarchy of the blocks/steps in the processes, flowcharts, and/or call flow diagrams may be rearranged. Further, some blocks/steps may be combined and/or omitted. Other blocks/steps may also be added. The accompanying method claims present elements of the various blocks/steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, where reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects.

Unless specifically stated otherwise, the term "some" refers to one or more and the term "or" may be interpreted as "and/or" where context does not dictate otherwise. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for." Unless stated otherwise, the phrase "a processor" may refer to "any of one or more processors" (e.g., one processor of one or more processors, a number (greater than one) of processors in the one or more processors, or all of the one or more processors) and the phrase "a memory" may refer to "any of one or more memories" (e.g., one memory of one or more memories, a number (greater than one) of memories in the one or more memories, or all of the one or more memories).

In one or more examples, the functions described herein may be implemented in hardware, software, firmware, or any combination thereof. For example, although the term "processing unit" has been used throughout this disclosure, such processing units may be implemented in hardware, software, firmware, or any combination thereof. If any function, processing unit, technique described herein, or other module is implemented in software, the function, processing unit, technique described herein, or other module may be stored on or transmitted over as one or more instructions or code on a computer-readable medium.

Computer-readable media may include computer data storage media or communication media including any medium that facilitates transfer of a computer program from one place to another. In this manner, computer-readable media generally may correspond to: (1) tangible computer-readable storage media, which is non-transitory; or (2) a communication medium such as a signal or carrier wave. Data storage media may be any available media that can be accessed by one or more computers or one or more processors to retrieve instructions, code, and/or data structures for implementation of the techniques described in this disclosure. By way of example, and not limitation, such computer-readable media may include RAM, ROM, EEPROM, compact disc-read only memory (CD-ROM), or other optical disk storage, magnetic disk storage, or other magnetic storage devices. Disk and disc, as used herein, includes compact disc (CD), laser disc, optical disc, digital versatile disc (DVD), floppy disk, and Blu-ray disc, where disks usually reproduce data magnetically, while discs usually reproduce data optically with lasers. Combinations of the above should also be included within the scope of computer-readable media. A computer program product may include a computer-readable medium.

The techniques of this disclosure may be implemented in a wide variety of devices or apparatuses, including a wireless handset, an integrated circuit (IC) or a set of ICs, e.g., a chip set. Various components, modules or units are described in this disclosure to emphasize functional aspects of devices configured to perform the disclosed techniques, but do not necessarily need realization by different hardware units. Rather, as described above, various units may be combined in any hardware unit or provided by a collection of inter-operative hardware units, including one or more processors as described above, in conjunction with suitable software and/or firmware. Accordingly, the term "processor," as used herein may refer to any of the foregoing structure or any other structure suitable for implementation of the techniques described herein. Also, the techniques may be fully implemented in one or more circuits or logic elements.

The following aspects are illustrative only and may be combined with other aspects or teachings described herein, without limitation.

Aspect 1 is a method of graphics processing, comprising: assigning each shading element in a set of shading elements associated with a geometry unit to a corresponding shading element group in a set of shading element groups; identifying whether each shading element in the set of shading elements is a visible shading element; calculating a group offset value for each shading element group in the set of shading element groups based on a number of visible shading elements in the set of shading elements; calculating an element offset value for each shading element within each of the shading element groups based on a number of visible shading elements in the shading element group; and allocating, based on the element offset value for each shading element within each of the shading element groups and the group offset value for each shading element group in the set of shading element groups, texture memory to the visible shading elements in each of the shading element groups.

Aspect 2 may be combined with aspect 1 and further comprises: outputting an indication of the allocated texture memory to the visible shading elements in each of the shading element groups.

Aspect 3 may be combined with aspect 2 and comprises that outputting the indication of the allocated texture memory includes: transmitting the indication of the allocated texture memory; or storing the indication of the allocated texture memory.

Aspect 4 may be combined with any of aspects 1-3 and comprises that the geometry unit includes at least one of a meshlet or a triangle.

Aspect 5 may be combined with any of aspects 1-4 and further comprises: marking each shading element in the set of shading elements as being visible or non-visible based on the identification, wherein calculating the group offset value includes calculating the group offset value based on whether a shading element is marked, and wherein calculating the element offset value includes calculating the element offset value based on whether the shading element is marked.

Aspect 6 may be combined with any of aspects 1-5 and comprises that assigning each shading element to the corresponding shading element group includes assigning a number of SC visibility bits to each shading element group.

Aspect 7 may be combined with any of aspects 1-6 and comprises that calculating the group offset value for each shading element group in the set of shading element groups based on the number of visible shading elements in the set of shading elements includes performing a wave operation on the set of shading element groups.

Aspect 8 may be combined with any of aspects 1-7 and further comprises: assigning a level of a mip region map to the visible shading elements in each of the shading element groups, wherein allocating the texture memory is further based on the assigned level.

Aspect 9 may be combined with any of aspects 1-8 and comprises that the texture memory includes physical memory of a graphics processor.

Aspect 10 may be combined with any of aspects 1-9 and further comprises: storing, in the texture memory, shaded tiles based on the visible shading elements in each of the shading element groups.

Aspect 11 may be combined with aspect 10 and comprises that the visible shading elements are associated with a set of texels, wherein each of the set of texels is associated with a primitive identifier and a material identifier, the method further including: associating a set of pixels in a screen space with the set of texels; providing, based on the association, the primitive identifier and the material identifier associated with each of the set of texels to a shader; and shading, via the shader, the set of texels based on the primitive identifier and the material identifier associated with each of the set of texels, wherein the set of texels is associated with the shaded tiles.

Aspect 12 may be combined with aspect 11 and further comprises: performing depth equals testing based on the primitive identifier and the material identifier associated with each of the set of texels and the visible shading elements, wherein shading the set of texels includes shading the set of texels further based on each of the set of texels passing the depth equals testing.

Aspect 13 may be combined with any of aspects 1-12 and comprises that the texture memory is associated with an addressed within a shading atlas.

Aspect 14 is an apparatus for graphics processing comprising a processor coupled to a memory and, based on information stored in the memory, the processor is configured to implement a method as in any of aspects 1-13.

Aspect 15 may be combined with aspect 14 and comprises that the apparatus is a wireless communication device comprising at least one of a transceiver or an antenna coupled to the processor.

Aspect 16 is an apparatus for graphics processing including means for implementing a method as in any of aspects 1-13.

Aspect 17 is a computer-readable medium (e.g., a non-transitory computer-readable medium) storing computer executable code, the computer executable code, when executed by a processor causes the processor to implement a method as in any of aspects 1-13.

Various aspects have been described herein. These and other aspects are within the scope of the following claims.

What is claimed is:

1. An apparatus for graphics processing, comprising:
a memory; and
a processor coupled to the memory and, based on information stored in the memory, the processor is configured to:
assign each shading element in a set of shading elements associated with a geometry unit to a corresponding shading element group in a set of shading element groups;
identify whether each shading element in the set of shading elements is a visible shading element;
calculate a group offset value for each shading element group in the set of shading element groups based on a number of visible shading elements in the set of shading elements;
calculate an element offset value for each shading element within each of the shading element groups based on a number of visible shading elements in the shading element group; and
allocate, based on the element offset value for each shading element within each of the shading element groups and the group offset value for each shading element group in the set of shading element groups, texture memory to the visible shading elements in each of the shading element groups.

2. The apparatus of claim 1, wherein the processor is further configured to:
output an indication of the allocated texture memory to the visible shading elements in each of the shading element groups.

3. The apparatus of claim 2, wherein to output the indication of the allocated texture memory, the processor is configured to:
transmit the indication of the allocated texture memory; or
store the indication of the allocated texture memory.

4. The apparatus of claim 1, wherein the geometry unit comprises at least one of a meshlet or a triangle.

5. The apparatus of claim 1, wherein the processor is further configured to:
mark each shading element in the set of shading elements as being visible or non-visible based on the identification, wherein to calculate the group offset value, the processor is configured to calculate the group offset value based on whether a shading element is marked, and wherein to calculate the element offset value, the processor is configured to calculate the element offset value based on whether the shading element is marked.

6. The apparatus of claim 1, wherein to assign each shading element to the corresponding shading element group, the processor is configured to assign one bit out of a number of SC visibility bits to each shading element in the corresponding shading element group.

7. The apparatus of claim 1, wherein to calculate the group offset value for each shading element group in the set of shading element groups based on the number of visible shading elements in the set of shading elements, the processor is configured to perform a wave operation on the set of shading element groups.

8. The apparatus of claim 1, wherein the processor is further configured to:

assign a level of a mip region map to the visible shading elements in each of the shading element groups, wherein to allocate the texture memory, the processor is configured to allocate the texture memory further based on the assigned level.

9. The apparatus of claim 1, wherein the texture memory comprises physical memory of a graphics processor.

10. The apparatus of claim 1, wherein the processor is further configured to:

store, in the texture memory, shaded tiles based on the visible shading elements in each of the shading element groups.

11. The apparatus of claim 10, wherein the visible shading elements are associated with a set of texels, wherein each of the set of texels is associated with a primitive identifier and a material identifier, and wherein the processor is further configured to:

associate a set of pixels in a screen space with the set of texels;

provide, based on the association, the primitive identifier and the material identifier associated with each of the set of texels to a shader; and shade, via the shader, the set of texels based on the primitive identifier and the material identifier associated with each of the set of texels, wherein the set of texels is associated with the shaded tiles.

12. The apparatus of claim 11, wherein the processor is further configured to:

perform depth equals testing based on the primitive identifier and the material identifier associated with each of the set of texels and the visible shading elements, wherein to shade the set of texels, the processor is configured to shade the set of texels further based on each of the set of texels passing the depth equals testing.

13. The apparatus of claim 1, wherein the texture memory is associated with an address within a shading atlas.

14. The apparatus of claim 1, wherein the apparatus is a wireless communication device comprising at least one of a transceiver or an antenna coupled to the processor.

15. A method of graphics processing, comprising:

assigning each shading element in a set of shading elements associated with a geometry unit to a corresponding shading element group in a set of shading element groups;

identifying whether each shading element in the set of shading elements is a visible shading element;

calculating a group offset value for each shading element group in the set of shading element groups based on a number of visible shading elements in the set of shading elements;

calculating an element offset value for each shading element within each of the shading element groups based on a number of visible shading elements in the shading element group; and allocating, based on the element offset value for each shading element within each of the shading element groups and the group offset value for each shading element group in the set of shading element groups, texture memory to the visible shading elements in each of the shading element groups.

16. The method of claim 15, further comprising:

outputting an indication of the allocated texture memory to the visible shading elements in each of the shading element groups.

17. The method of claim 16, wherein outputting the indication of the allocated texture memory comprises:

transmitting the indication of the allocated texture memory; or storing the indication of the allocated texture memory.

18. The method of claim 15, wherein the geometry unit comprises at least one of a meshlet or a triangle.

19. The method of claim 15, further comprising:

marking each shading element in the set of shading elements as being visible or non-visible based on the identification, wherein calculating the group offset value comprises calculating the group offset value based on whether a shading element is marked, and wherein calculating the element offset value comprises calculating the element offset value based on whether the shading element is marked.

20. The method of claim 15, wherein assigning each shading element to the corresponding shading element group comprises assigning one bit out of a number of SC visibility bits to each shading element in the corresponding shading element group.

21. The method of claim 15, wherein calculating the group offset value for each shading element group in the set of shading element groups based on the number of visible shading elements in the set of shading elements comprises performing a wave operation on the set of shading element groups.

22. The method of claim 15, further comprising:

assigning a level of a mip region map to the visible shading elements in each of the shading element groups, wherein allocating the texture memory is further based on the assigned level.

23. The method of claim 15, wherein the texture memory comprises physical memory of a graphics processor.

24. The method of claim 15, further comprising:

storing, in the texture memory, shaded tiles based on the visible shading elements in each of the shading element groups.

25. The method of claim 24, wherein the visible shading elements are associated with a set of texels, wherein each of the set of texels is associated with a primitive identifier and a material identifier, the method further comprising:

associating a set of pixels in a screen space with the set of texels;

providing, based on the association, the primitive identifier and the material identifier associated with each of the set of texels to a shader; and shading, via the shader, the set of texels based on the primitive identifier and the material identifier associated with each of the set of texels, wherein the set of texels is associated with the shaded tiles.

26. The method of claim 25, further comprising:

performing depth equals testing based on the primitive identifier and the material identifier associated with each of the set of texels and the visible shading elements, wherein shading the set of texels comprises shading the set of texels further based on each of the set of texels passing the depth equals testing.

27. The method of claim 15, wherein the texture memory is associated with an address within a shading atlas.

28. A non-transitory computer-readable medium storing computer executable code, the computer executable code, when executed by a processor, causes the processor to:

assign each shading element in a set of shading elements associated with a geometry unit to a corresponding shading element group in a set of shading element groups;

identify whether each shading element in the set of shading elements is a visible shading element;

calculate a group offset value for each shading element group in the set of shading element groups based on a number of visible shading elements in the set of shading elements;

calculate an element offset value for each shading element within each of the shading element groups based on a number of visible shading elements in the shading element group; and allocate, based on the element offset value for each shading element within each of the shading element groups and the group offset value for each shading element group in the set of shading element groups, texture memory to the visible shading elements in each of the shading element groups.

29. The non-transitory computer-readable medium of claim 28, wherein the code, when executed by the processor, further causes the processor to:

output an indication of the allocated texture memory to the visible shading elements in each of the shading element groups.

30. The non-transitory computer-readable medium of claim 28, wherein the geometry unit comprises at least one of a meshlet or a triangle.

\* \* \* \* \*